United States Patent
Ren et al.

(10) Patent No.: US 10,693,690 B2
(45) Date of Patent: Jun. 23, 2020

(54) DATA SYMBOL TRANSMISSION METHOD AND WIRELESS DEVICE

(71) Applicant: HUAWEI TECHNOLOGIES CO., LTD., Shenzhen, Guangdong (CN)

(72) Inventors: Haibao Ren, Shanghai (CN); Bingyu Qu, Beijing (CN); Yuanjie Li, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 33 days.

(21) Appl. No.: 16/009,204

(22) Filed: Jun. 15, 2018

(65) Prior Publication Data
US 2018/0295006 A1 Oct. 11, 2018

Related U.S. Application Data

(63) Continuation of application No. PCT/CN2016/110186, filed on Dec. 15, 2016.

(30) Foreign Application Priority Data

Dec. 17, 2015 (CN) .......................... 2015 1 0951688

(51) Int. Cl.
*H04L 27/26* (2006.01)
*H04B 7/06* (2006.01)
(Continued)

(52) U.S. Cl.
CPC ....... *H04L 27/2607* (2013.01); *H04B 7/0695* (2013.01); *H04J 3/16* (2013.01);
(Continued)

(58) Field of Classification Search
CPC ............ H04L 27/2607; H04L 27/2666; H04L 5/0053; H04L 5/0044; H04L 51/063;
(Continued)

(56) References Cited

U.S. PATENT DOCUMENTS

| | | | |
|---|---|---|---|
| 2008/0137562 A1* | 6/2008 | Li | H04B 7/2656 370/280 |
| 2009/0073902 A1* | 3/2009 | Astely | H04B 7/2656 370/280 |

(Continued)

FOREIGN PATENT DOCUMENTS

| | | |
|---|---|---|
| CN | 101808411 A | 8/2010 |
| CN | 102244558 A | 11/2011 |

(Continued)

OTHER PUBLICATIONS

XP011277428, Seokhyun Yoon et al.,"Hybrid Beam-Forming and Beam-Switching for OFDM Based Wireless Personal Area Networks", IEEE Journal on Selected Areas in Communications, vol. 27, No. 8, Oct. 2009, 8 pages.

(Continued)

*Primary Examiner* — Warner Wong
(74) *Attorney, Agent, or Firm* — Womble Bond Dickinson (US) LLP

(57) ABSTRACT

A data symbol transmission method and a wireless network device are provided. The device includes: an information determining unit, configured to determine a location at which hardware switching needs to be performed in a current subframe and switching time of the hardware switching; a configuration unit, configured to configure, according to the switching time, a first guard period for a first data symbol corresponding to the location, where a length of the first guard period is greater than or equal to that of the switching time; where the configuration unit is further configured to: use, as a second data symbol, a data symbol in the subframe other than the first data symbol, and configure a second guard period for the second data symbol; and a sending unit, configured to send the subframe to another (Continued)

wireless network device. Resource utilization can be improved, and a system capacity can be increased.

20 Claims, 12 Drawing Sheets

(51) Int. Cl.
| | |
|---|---|
| *H04J 3/16* | (2006.01) |
| *H04L 5/00* | (2006.01) |
| *H04W 16/28* | (2009.01) |
| *H04W 72/04* | (2009.01) |
| *H04L 25/03* | (2006.01) |
| *H04W 4/18* | (2009.01) |
| *H04L 12/58* | (2006.01) |
| *H04W 80/00* | (2009.01) |
| *H04L 12/40* | (2006.01) |

(52) U.S. Cl.
CPC .......... *H04L 5/0053* (2013.01); *H04W 16/28* (2013.01); *H04W 72/0446* (2013.01); *H04L 12/40071* (2013.01); *H04L 25/03159* (2013.01); *H04L 51/063* (2013.01); *H04L 51/066* (2013.01); *H04L 2025/0356* (2013.01); *H04W 4/18* (2013.01); *H04W 80/00* (2013.01)

(58) Field of Classification Search
CPC ............. H04L 51/066; H04L 12/40071; H04L 41/0813; H04L 41/0816; H04L 2025/03592; H04L 2025/0356; H04L 1/0025; H04L 12/2856; H04W 4/18; H04W 16/28; H04W 72/0446; H04W 28/0273
See application file for complete search history.

(56) References Cited

U.S. PATENT DOCUMENTS

| | | | | |
|---|---|---|---|---|
| 2009/0201838 | A1* | 8/2009 | Zhang | H04B 7/2656 370/280 |
| 2010/0278083 | A1* | 11/2010 | Kwak | H04B 7/26 370/280 |
| 2011/0044215 | A1* | 2/2011 | Kim | H04B 7/2656 370/280 |
| 2012/0230232 | A1* | 9/2012 | Ji | H04B 7/2656 370/280 |
| 2012/0275357 | A1* | 11/2012 | Tirkkonen | H04L 1/0083 370/310 |
| 2013/0022143 | A1 | 1/2013 | Ko et al. | |
| 2013/0028186 | A1 | 1/2013 | Kim et al. | |
| 2013/0051364 | A1 | 2/2013 | Seol et al. | |
| 2013/0083736 | A1* | 4/2013 | Yin | H04W 72/0446 370/329 |
| 2013/0336302 | A1* | 12/2013 | Lee | H04L 5/001 370/336 |
| 2014/0016620 | A1 | 1/2014 | Singh et al. | |
| 2014/0098912 | A1 | 4/2014 | Yin et al. | |
| 2014/0355626 | A1 | 12/2014 | Fechtel | |
| 2015/0043392 | A1* | 2/2015 | Susitaival | H04L 5/1469 370/280 |
| 2015/0146647 | A1* | 5/2015 | Chatterjee | H04L 5/0032 370/329 |
| 2015/0358998 | A1* | 12/2015 | Golitschek Edler von Elbwart | H04W 48/16 370/280 |
| 2016/0080133 | A1* | 3/2016 | Golitschek Edler von Elbwart | H04W 72/0446 370/280 |
| 2016/0182213 | A1* | 6/2016 | Golitschek Edler von Elbwart | H04L 1/1854 370/294 |
| 2017/0201304 | A1 | 7/2017 | Kim | |
| 2018/0351713 | A1* | 12/2018 | Wang | H04L 1/00 |

FOREIGN PATENT DOCUMENTS

| | | |
|---|---|---|
| CN | 103748801 A | 4/2014 |
| CN | 103875271 A | 6/2014 |
| CN | 104471866 A | 3/2015 |
| CN | 105122755 A | 12/2015 |
| WO | 2016053576 A1 | 4/2016 |

OTHER PUBLICATIONS

XP032694773, Gilberto Berardinelli et al.,"On the Potential of Zero-Tail DFT-Spread-OFDM in 5G Networks", 2014 IEEE 80th Vehicular Technology Conference (VTC2014-Fall), 6 pages.

* cited by examiner

DATA SYMBOL TRANSMISSION METHOD AND WIRELESS DEVICE

CROSS-REFERENCE TO RELATED APPLICATIONS

This application is a continuation of International Application No. PCT/CN2016/110186, filed on Dec. 15, 2016, which claims priority to Chinese Patent Application No. 201510951688.6, filed on Dec. 17, 2015. The disclosures of the aforementioned applications are hereby incorporated by reference in their entireties.

TECHNICAL FIELD

The present invention relates to the field of communications technologies, and in particular, to a data symbol transmission method and a wireless network device.

BACKGROUND

In a broadband communications system, when receiving data, a receiver usually performs frequency-domain equalization, so as to resist channel frequency-domain selective fading caused by multiple paths. When the receiver performs frequency-domain equalization, it needs to be ensured that no inter-symbol interference is caused by a received symbol over a next symbol, and therefore, it is required to reserve a guard period before each symbol to resist inter-symbol interference from a previous symbol. Frequently-used guard period design methods include a cyclic prefix (CP) method, a zero prefix (ZP), and a zero tail (ZT) method. In addition, to reduce power consumption of a base station and user equipment (UE), currently coverage of the base station may be expanded by using multiple antennas to perform beamforming (BF), including digital beamforming (DBF), analog beamforming (ABF), and hybrid beamforming (HBF). Beamforming in the ABF technology and the HBF technology is completed by relying on a radio-frequency phase shifter. When adjusting a phase, the radio-frequency phase shifter needs to take time, that is, an impact of beam switching time needs to be considered.

Currently, in actual application, for example, in a CP communications system, as shown in FIG. 1, considering the beam switching time, a guard period (GP) is reserved before a CP of a symbol at which beam switching needs to be performed, so that beam switching does not affect normal sending or receiving of a next symbol. However, in this manner, an extra GP needs to be reserved based on the CP, thereby reducing available air interface resources, causing air interface resource utilization to decrease, and reducing a system capacity.

SUMMARY

Embodiments of the present invention provide a data symbol transmission method and a wireless network device, so as to improve resource utilization and increase a system capacity.

According to a first aspect, an embodiment of the present invention provides a wireless network device operating as a first wireless network device, including an information determining unit, a configuration unit, and a sending unit; where the information determining unit is configured to determine a location at which hardware switching needs to be performed in a current subframe and switching time of the hardware switching;

the configuration unit is configured to configure, according to the switching time, a first guard period for a first data symbol corresponding to the location, where a length of the first guard period is greater than or equal to that of the switching time;

the configuration unit is further configured to: use, as a second data symbol, a data symbol in the subframe other than the first data symbol, and configure a second guard period for the second data symbol; and the sending unit is configured to send the subframe to second wireless network device.

The first wireless network device may be a base station or user equipment; and the second wireless network device may be user equipment or a base station. For example, communication related to this embodiment of the present invention may be between the base station and the user equipment; or may be between base stations, for example, between a macro base station and a micro base station; or may be between different user equipments, for example, communication in a device to device (D2D) network.

The first guard period may include a zero prefix ZP or a zero tail ZT, and the second guard period may be a cyclic prefix CP.

In some embodiments, the sending unit is configured to:

send the first data symbol, the first guard period, the second data symbol, and the second guard period to the another wireless network device in a time-division multiplexing manner, where the first data symbol and the second data symbol include data that needs to be transmitted.

In some embodiments, the wireless network device further includes:

a comparison unit, configured to compare the length of the first guard period with a length of the second guard period, where the length of the second guard period is pre-configured; where the configuration unit is further configured to: when a comparison result of the comparison unit is that the length of the first guard period is less than the length of the second guard period, configure the length of the first guard period to be the same as that of the second guard period.

In some embodiments, the wireless network device further includes:

a comparison unit, configured to separately compare the length of the first guard period with a length of the second guard period and a length of a second symbol, where the second symbol includes the second data symbol and the second guard period; and a determining unit, configured to determine whether a system in which the subframe is located is a single-carrier system; where the configuration unit is further configured to: when the determining unit determines that the system in which the subframe is located is a single-carrier system, and the comparison result of the comparison unit is that the length of the first guard period is greater than the length of the second guard period and the length of the first guard period is less than the length of the second symbol, use a difference between the length of the second symbol and the length of the first guard period as a length of data that is in the first data symbol and that needs to be transmitted.

In some embodiments, the wireless network device further includes:

a comparison unit, configured to separately compare the length of the first guard period with a length of the second guard period and the length of the second symbol, where the second symbol includes the second data symbol and the second guard period;

a determining unit, configured to determine whether a system in which the subframe is located is a single-carrier system; and a mapping unit, configured to: when the determining unit determines that the system in which the subframe is located is not a single-carrier system, and the comparison result of the comparison unit is that the length of the first guard period is greater than the length of the second guard period and the length of the first guard period is less than the length of the second symbol, calculate a difference between the length of the first guard period and the length of the second guard period, determine, according to the difference and a length of the second data symbol, a quantity of subcarriers required for spacing, and perform frequency-domain distributed resource mapping according to the quantity of sub carriers; where the configuration unit is further configured to: use, as a length of the first data symbol, a difference between the length of the second symbol and the length of the first guard period, and use a target length in the first data symbol as a length of the data that needs to be transmitted, where the target length is a quotient obtained by dividing the length of the second data symbol by a sum of one and the quantity of subcarriers.

Distributed resource mapping is mapping performed on data of a subcarrier at intervals of subcarriers for spacing (that is, the foregoing quantity of subcarriers), and zeros are added to or no data is sent on the subcarriers for spacing, that is, the subcarrier corresponding to the quantity of subcarriers.

A specific manner in which the mapping unit determines, according to the difference and the length of the second data symbol, the quantity of subcarriers required for spacing is as follows: the mapping unit compares a quotient obtained by dividing the difference by the length of the second data symbol with $(k-1)/k$ and $k/(k+1)$; and if the quotient is less than or equal to $(k-1)/k$, the mapping unit determines that the quantity of subcarriers required for spacing is $k-1$; or if the quotient is greater than $(k-1)/k$ and less than $k/(k+1)$, the mapping unit determines that the quantity of subcarriers required for spacing is k, where k is an integer greater than or equal to 2.

In some embodiments, the sending unit is further configured to send a notification message to the second wireless network device, where the notification message is used to notify the second wireless network device of configuration information of the subframe, and the configuration information includes one or more of location information of the first data symbol, location information of the first guard period, or length information of the first guard period.

The notification message may be sent to the second wireless network device by the wireless network device by using a broadcast channel or a control channel. Specifically, the notification message includes, but is not limited to, a synchronization channel, a physical broadcast message, a system broadcast message indicated by a physical common control channel, and the like.

In some embodiments, the location information of the first data symbol, the location information of the first guard period, and the length information of the first guard period are determined with the second wireless network device in advance.

According to a second aspect, an embodiment of the present invention further provides a wireless network device operating as a first wireless network device, including a receiving unit and a processing unit; where the receiving unit is configured to receive a subframe sent by a second wireless network device, where the subframe includes a first symbol configured with a first guard period and a second symbol configured with a second guard period; and the processing unit is configured to: perform frequency-domain equalization on the first symbol by using a frequency-domain equalization technology corresponding to the first guard period, and perform frequency-domain equalization on the second symbol by using a frequency-domain equalization technology corresponding to the second guard period.

The wireless network device may be user equipment or a base station; and the second wireless network device may be a base station or user equipment.

The first symbol further includes a first data symbol, the second symbol further includes a second data symbol, and the first data symbol and the second data symbol include the data that needs to be transmitted. Optionally, the first guard period may include a zero prefix ZP or a zero tail ZT, and the second guard period may be a cyclic prefix CP.

In some embodiments, a specific manner in which the processing unit performs frequency-domain equalization on the first symbol by using the frequency-domain equalization technology corresponding to the first guard period is:

determining whether a carrier system in which the subframe is located is a single-carrier system; and if the carrier system in which the subframe is located is a single-carrier system, performing frequency-domain equalization on the first symbol by using the frequency-domain equalization technology corresponding to the first guard period; or if the carrier system in which the subframe is located is not a single-carrier system, performing frequency-domain equalization on the first symbol by using the frequency-domain equalization technology corresponding to the second guard period.

In some embodiments, the receiving unit is further configured to: receive a notification message that is sent by the another wireless network device and that includes configuration information of the subframe, and receive the subframe according to the configuration information, where the configuration information includes one or more of location information of the first data symbol, location information of the first guard period, or length information of the first guard period.

In some embodiments, the location information of the first data symbol, the location information of the first guard period, and the length information of the first guard period are determined with the another wireless network device in advance.

According to a third aspect, an embodiment of the present invention provides a data symbol transmission method, where the data symbol transmission method is applied to a wireless network device and includes:

determining a location at which hardware switching needs to be performed in a current subframe and switching time of the hardware switching;

configuring, according to the switching time, a first guard period for a first data symbol corresponding to the location, where a length of the first guard period is greater than or equal to that of the switching time;

using, as a second data symbol, a data symbol in the subframe other than the first data symbol, and configuring a second guard period for the second data symbol; and sending the subframe to another wireless network device.

The first guard period may include a zero prefix ZP or a zero tail ZT, and the second guard period may be a cyclic prefix CP.

In some embodiments, the sending the subframe to another wireless network device includes:

sending the first data symbol, the first guard period, the second data symbol, and the second guard period to the another wireless network device in a time-division multiplexing manner, where the first data symbol and the second data symbol include data that needs to be transmitted.

In some embodiments, before the sending the subframe to another wireless network device, the method further includes:

comparing the length of the first guard period with a length of the second guard period, where the length of the second guard period is pre-configured; and if the length of the first guard period is less than the length of the second guard period, configuring the length of the first guard period to be the same as that of the second guard period.

In some embodiments, before the sending the subframe to another wireless network device, the method further includes:

separately comparing the length of the first guard period with the length of the second guard period and a length of a second symbol, where the second symbol includes the second data symbol and the second guard period;

determining whether a system in which the subframe is located is a single-carrier system; and if the system in which the subframe is located is a single-carrier system, the length of the first guard period is greater than the length of the second guard period, and the length of the first guard period is less than the length of the second symbol, using a difference between the length of the second symbol and the length of the first guard period as a length of data that is in the first data symbol and that needs to be transmitted.

In some embodiments, before the sending the subframe to another wireless network device, the method further includes:

separately comparing the length of the first guard period with the length of the second guard period and a length of a second symbol, where the second symbol includes the second data symbol and the second guard period;

determining whether a system in which the subframe is located is a single-carrier system;

if the system in which the subframe is located is not a single-carrier system, the length of the first guard period is greater than the length of the second guard period, and the length of the first guard period is less than the length of the second symbol, calculating a difference between the length of the first guard period and the length of the second guard period, determining, according to the difference and a length of the second data symbol, a quantity of subcarriers required for spacing, and performing frequency-domain distributed resource mapping according to the quantity of subcarriers, so that the another wireless network device demodulates the first data symbol; and using, as a length of the first data symbol, a difference between the length of the second symbol and the length of the first guard period, and using a target length in the first data symbol as a length of the data that needs to be transmitted, where the target length is a quotient obtained by dividing the length of the second data symbol by a sum of one and the quantity of subcarriers.

Distributed resource mapping is mapping performed on data of a subcarrier at intervals of subcarriers for spacing (that is, the foregoing quantity of subcarriers), and zeros are added to or no data is sent on the subcarriers for spacing, that is, the subcarrier corresponding to the quantity of subcarriers.

A specific manner in which the quantity of subcarriers required for spacing is determined according to the difference and the length of the second data symbol is: comparing a quotient obtained by dividing the difference by the length of the second data symbol with $(k-1)/k$ and $k/(k+1)$; and if the quotient is less than or equal to $(k-1)/k$, determining that the quantity of subcarriers required for spacing is $k-1$; or if the quotient is greater than $(k-1)/k$ and less than $k/(k+1)$, determining that the quantity of subcarriers required for spacing is $k$, where $k$ is an integer greater than or equal to 2.

In some embodiments, the method further includes:

sending a notification message to the another wireless network device, where the notification message is used to notify the another wireless network device of configuration information of the subframe, and the configuration information includes one or more of location information of the first data symbol, location information of the first guard period, or length information of the first guard period.

The notification message may be sent to the another wireless network device by the wireless network device by using a broadcast channel or a control channel. Specifically, the notification message includes, but is not limited to, a synchronization channel, a physical broadcast message, a system broadcast message indicated by a physical common control channel, and the like.

In some embodiments, the location information of the first data symbol, the location information of the first guard period, and the length information of the first guard period are determined with the another wireless network device in advance.

According to a fourth aspect, an embodiment of the present invention further provides a data symbol transmission method, where the data symbol transmission method is applied to a wireless network device and includes:

receiving a subframe sent by another wireless network device, where the subframe includes a first symbol configured with a first guard period and a second symbol configured with a second guard period; and performing frequency-domain equalization on the first symbol by using a frequency-domain equalization technology corresponding to the first guard period, and performing frequency-domain equalization on the second symbol by using a frequency-domain equalization technology corresponding to the second guard period.

The first symbol further includes a first data symbol, the second symbol further includes a second data symbol, and the first data symbol and the second data symbol include the data that needs to be transmitted. Optionally, the first guard period may include a zero prefix ZP or a zero tail ZT, and the second guard period may be a cyclic prefix CP.

In some embodiments, the performing frequency-domain equalization on the first symbol by using a frequency-domain equalization technology corresponding to the first guard period includes:

determining whether a carrier system in which the subframe is located is a single-carrier system; and if the carrier system in which the subframe is located is a single-carrier system, performing frequency-domain equalization on the first symbol by using the frequency-domain equalization technology corresponding to the first guard period; or if the carrier system in which the subframe is located is not a single-carrier system, performing frequency-domain equalization on the first symbol by using the frequency-domain equalization technology corresponding to the second guard period.

In some embodiments, the method further includes:

receiving a notification message that is sent by the another wireless network device and that includes configuration information of the subframe, and receiving the subframe according to the configuration information, where the configuration information includes one or more of location information of the first data symbol, location information of the first guard period, or length information of the first guard period.

In some embodiments, the location information of the first data symbol, the location information of the first guard period, and the length information of the first guard period are determined with the another wireless network device in advance.

According to a fifth aspect, an embodiment of the present invention provides a data symbol transmission system, including a first wireless network device and a second wireless network device, where the first wireless network device is configured to: determine a location at which hardware switching needs to be performed in a current subframe and switching time of the hardware switching; configure, according to the switching time, a first guard period for a first data symbol corresponding to the location, where a length of the first guard period is greater than or equal to that of the switching time; use, as a second data symbol, a data symbol in the subframe other than the first data symbol, and configure a second guard period for the second data symbol; and send the subframe to the second wireless network device; and the second wireless network device is configured to: receive the subframe sent by the first wireless network device, where the subframe includes a first symbol configured with the first guard period and a second symbol configured with the second guard period; and perform frequency-domain equalization on the first symbol by using a frequency-domain equalization technology corresponding to the first guard period, and perform frequency-domain equalization on the second symbol by using a frequency-domain equalization technology corresponding to the second guard period.

The first wireless network device may be a base station, or may be user equipment; and the second wireless network device may be user equipment, or may be a base station.

For example, communication related to this embodiment of the present invention may be between the base station and the user equipment; or may be between base stations, for example, between a macro base station and a micro base station; or may be between different user equipments, for example, communication in a D2D network.

The first symbol includes the first guard period and the first data symbol, the second symbol further includes the second guard period and the second data symbol, and the first data symbol and the second data symbol include the data that needs to be transmitted. Optionally, the first guard period may include a zero prefix ZP or a zero tail ZT, and the second guard period may be a cyclic prefix CP.

In some embodiments, that the second wireless network device performs frequency-domain equalization on the first symbol by using a frequency-domain equalization technology corresponding to the first guard period may be specifically: determining, by the second wireless network device, whether a carrier system in which the subframe is located is a single-carrier system; and if the carrier system in which the subframe is located is a single-carrier system, performing, by the second wireless network device, frequency-domain equalization on the first symbol by using the frequency-domain equalization technology corresponding to the first guard period; or if the carrier system in which the subframe is located is not a single-carrier system, performing, by the second wireless network device, frequency-domain equalization on the first symbol by using the frequency-domain equalization technology corresponding to the second guard period.

In some embodiments, the system further has the following functions:

sending, by the first wireless network device to the second wireless network device, a notification message that includes the configuration information of the subframe, where the configuration information includes one or more of location information of the first data symbol, location information of the first guard period, or length information of the first guard period; and receiving, by the second wireless network device, the notification message that includes configuration information of the subframe, and receiving the subframe according to the configuration information.

In some embodiments, alternatively, the location information of the first data symbol, the location information of the first guard period, and the length information of the first guard period may be determined by the first wireless network device and the second wireless network device in advance.

According to a sixth aspect, an embodiment of the present invention further provides a computer storage medium, where the computer storage medium stores a program, and when the program is executed, some or all steps of the data symbol transmission method according to the third aspect are performed.

According to a seventh aspect, an embodiment of the present invention further provides a computer storage medium, where the computer storage medium stores a program, and when the program is executed, some or all steps of the data symbol transmission method according to the fourth aspect are performed.

According to an eighth aspect, an embodiment of the present invention provides a wireless network device, including: a communications interface, a memory, and a processor, where the processor is separately connected to the communications interface and the memory; where the memory is configured to store driver software; and the processor reads the driver software from the memory, and performs, when driven by the driver software, some or all steps of the data symbol transmission method according to the third aspect.

Optionally, the wireless network device is a base station or user equipment.

According to a ninth aspect, an embodiment of the present invention provides a wireless network device, including: a communications interface, a memory, and a processor, where the processor is separately connected to the communications interface and the memory; where the memory is configured to store driver software; and the processor reads the driver software from the memory, and performs, when driven by the driver software, some or all steps of the data symbol transmission method according to the fourth aspect.

Optionally, the wireless network device is a base station or user equipment.

Implementation of the embodiments of the present invention brings the following beneficial effects:

In the embodiments of the present invention, the wireless network device can dynamically configure the guard period for the symbol in the cell according to the hardware switching location and the required switching time, and perform special processing on a sent symbol at the hardware switching location, without a need to reserve an extra GP, thereby reducing required air interface reservation overheads at the hardware switching location, effectively improving air interface resource utilization, increasing available air interface resources, and improving a system capacity. In addition, different cells may be enabled to implement adaptive configuration of the guard period, thereby reducing complexity of uniformly designing a frame structure.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following describes the technical solutions in the embodiments of the present invention with reference to the accompanying drawings in the embodiments of the present invention.

It should be understood that the technical solutions in the embodiments of the present invention may be specifically applied to various communications networks, for example, the Global System for Mobile Communications (GSM), a Code Division Multiple Access (CDMA) system, Wideband Code Division Multiple Access (WCDMA), general packet radio service (GPRS), Long Term Evolution (LTE), and a future network such as 5th Generation, a D2D (device to device) network, and an M2M (machine to machine) network.

The embodiments of the present invention are described with reference to a wireless network device. The wireless network device may be a base station or user equipment. For example, communication related to the embodiments of the present invention may be between the base station and the user equipment or between base stations, for example, between a macro base station and a micro base station; or may be between different user equipments, for example, communication in the D2D network.

In the embodiments of the present invention, the user equipment (UE) may be further referred to as a terminal, a mobile station (MS), a mobile terminal, or the like. The user equipment may communicate with one or more core networks by using a radio access network (RAN). The user equipment may be the mobile terminal such as a mobile phone (or referred to as a "cellular" phone) or a computer having a mobile terminal function; or may be a portable, pocket-sized, handheld, computer built-in, or in-vehicle mobile apparatus, which exchanges voice and/or data with the radio access network. In the embodiments of the present invention, the base station may be a base station in the GSM or the CDMA, for example, a base transceiver station (BTS); or may be a base station in the WCDMA, for example, a NodeB; or may be an evolved NodeB in the LTE, for example, an eNB or an e-NodeB, or a base station in the future network. This is not limited in the embodiments of the present invention.

Figure 1:
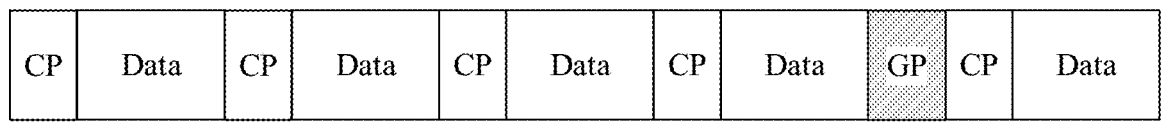
FIG. 1 is a diagram of a frame structure for beam switching in the prior art.
Figure 2:
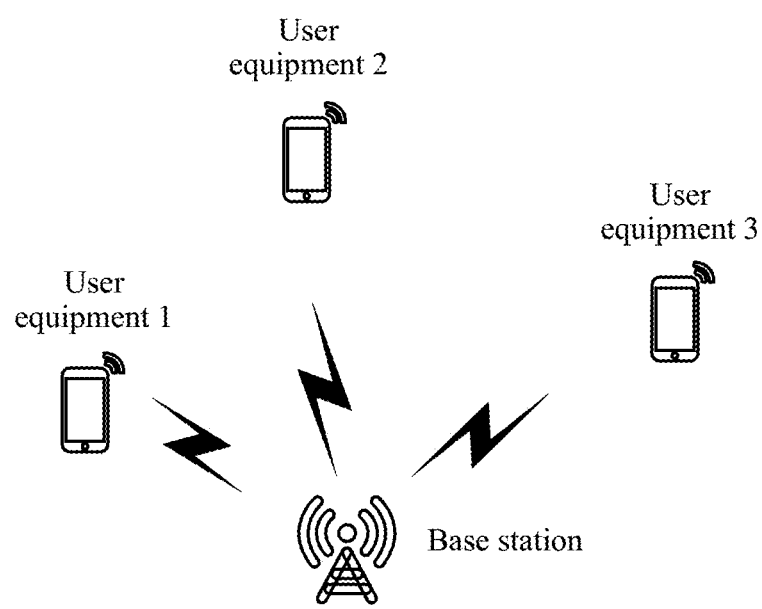
FIG. 2 is an architecture diagram of a communications system according to an embodiment of the present invention.

The following describes an application scenario in the embodiments of the present invention by using communication between the base station and the user equipment as an example. Referring to FIG. 2, FIG. 2 is an architecture diagram of a communications system according to an embodiment of the present invention. Specifically, as shown in FIG. 2, the communications system includes the base station and at least one user equipment (the figure only shows user equipment 1, user equipment 2, and user equipment 3). The base station communicates with the user equipment by using a radio signal, the radio signal includes a subframe including multiple symbols, and the symbol may be used as a basic unit of the radio signal. Generally, the radio signal used for communication is sent or received in a specific modulation manner. Modulation manners of the radio signal may fall into two categories: single-carrier modulation (for example, time division multiplexing and code division multiplexing) and multi-carrier modulation (for example, frequency division multiplexing).

It should be understood that, in the communications system architecture shown in FIG. 2, a situation in which there is only one base station (isolated base station) is shown. However, this embodiment of the present invention is not limited thereto. In addition to the base station, the communications system may further include an adjacent base station and user equipment that transmit a service on a same time-frequency resource, and coverage of each base station may further include another quantity of user equipments. Further, optionally, the wireless communications system that is in FIG. 2 and in which the base station and the user equipment are located may further include another network entity such as a mobility management entity, and this is not limited in this embodiment of the present invention.

Figure 3A:
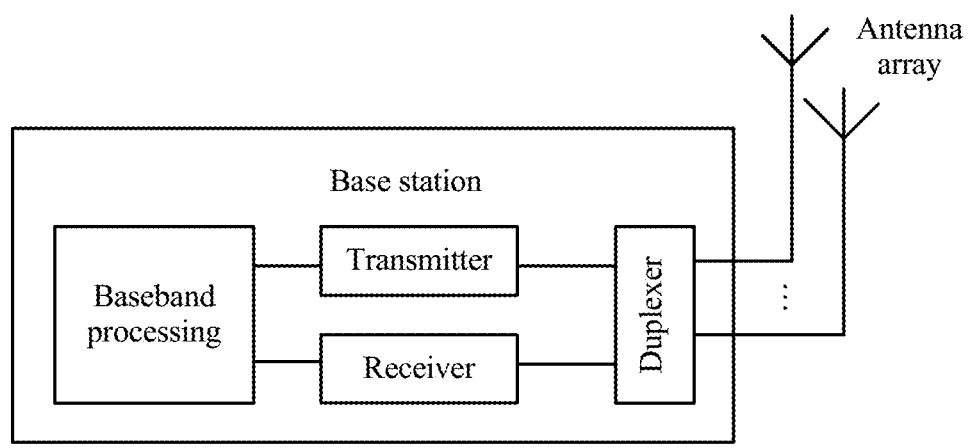
FIG. 3a is a schematic structural diagram of a base station in the communications system shown in FIG. 2.
Figure 3B:
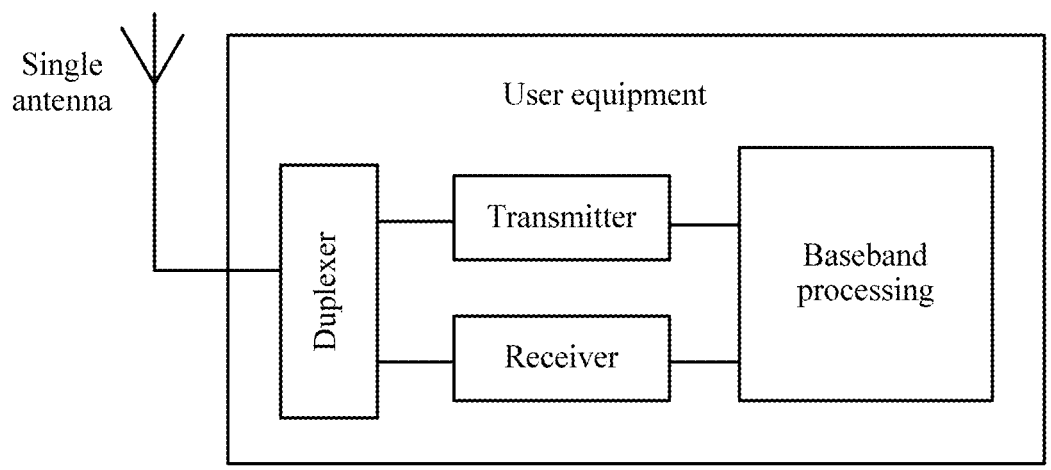
FIG. 3b is a schematic structural diagram of user equipment in the communications system shown in FIG. 2.

Further, referring to both FIG. 3a and FIG. 3b, FIG. 3a is a schematic structural diagram of a base station in the communications system shown in FIG. 2, and FIG. 3b is a schematic structural diagram of user equipment in the communications system shown in FIG. 2. As shown in FIG. 3a, the base station may include an antenna array, a duplexer, a transmitter (TX), a receiver (RX) (the TX and the RX may be collectively referred to as a transceiver TRX), and a baseband processing part. The duplexer is configured to implement the antenna array, and may be configured to send a signal and receive a signal. The TX is configured to implement conversion between a radio frequency signal and a baseband signal. Generally, the TX may include a power amplifier (PA), a digital-to-analog converter (DAC), and a frequency converter. The PA generally operates within a specific linear range, and when input signal amplitude is significantly changed, the PA operates in a non-linear range, thereby lowering efficiency of the PA. Generally, the RX may include a low noise amplifier (LNA), an analog-to-digital converter (ADC), and a frequency converter. The baseband processing part is configured to implement processing of a sent signal or a received signal, for example, layer mapping, precoding, modulation/demodulation, and coding/decoding, and separately perform processing on a physical control channel, a physical data channel, a physical broadcast channel, a reference signal, and the like. Further, the base station may further include a control part that is configured to perform multi-user scheduling and resource allocation, pilot scheduling, user physical layer parameter configuration, and the like.

As shown in FIG. 3b, FIG. 3b is the schematic structural diagram of the user equipment in the communications system shown in FIG. 2. The user equipment may include an antenna, a duplexer, a TX, an RX (the TX and the RX may be collectively referred to as a transceiver TRX), and a baseband processing part. As shown in FIG. 3b, the user equipment has a single antenna. It should be understood that the user equipment may also have multiple antennas (that is, an antenna array). The duplexer implements the antenna array, and may be configured to send a signal and receive a signal. The TX is configured to implement conversion between a radio frequency signal and a baseband signal. Generally, the TX may include a PA, a DAC, and a frequency converter. Because UE is powered by a battery, the UE is more sensitive to power amplification efficiency of the PA. Generally, the RX may include an LNA, an ADC, and a frequency converter. The baseband processing part is configured to implement processing of a sent signal or a received signal, for example, layer mapping, precoding, modulation/demodulation, and coding/decoding, and separately perform processing on a physical control channel, a physical data channel, a physical broadcast channel, and a reference signal. Further, the user equipment may further include a control part that is configured to: request an uplink physical resource, calculate channel state information (CSI) corresponding to a downlink channel, determine whether a downlink data packet is successfully received, and the like.

It should be noted that the technical solution in this embodiment of the present invention may be specifically applied to the foregoing baseband processing part.

It should be understood that, when there is a hardware switching delay that causes discontinuous sending or receiving in the communications system, a hardware switching guard period needs to be reserved for the system. The hardware switching includes, but is not limited to, duplexer switching, switching of beams formed by the antenna array, and the like. The switching of the beams of the antenna array includes switching of analog beams formed by the antenna array, and switching of hybrid beams formed by the antenna array.

Figure 4:
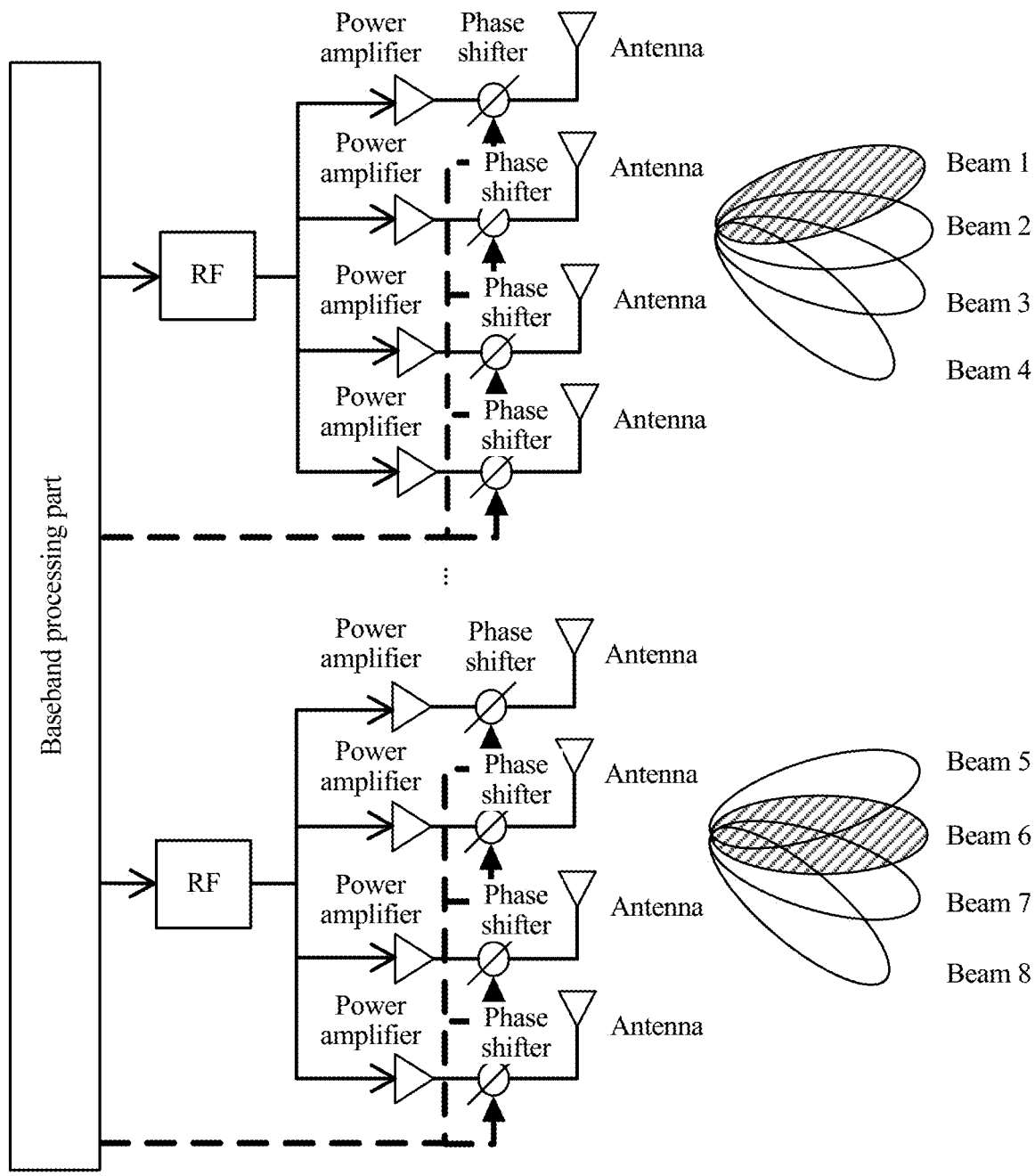
FIG. 4 is a schematic diagram of a structure for hybrid beamforming according to an embodiment of the present invention.

Further, referring to FIG. 4, FIG. 4 is a schematic diagram of a structure for hybrid beamforming according to an embodiment of the present invention. The structure for hybrid beamforming may be specifically disposed in a wireless network device. As shown in FIG. 4, the baseband processing part completes general baseband digital signal processing that includes one or more of a CRC check, coding, modulation, scrambling, or digital beamforming. A digital signal processed by the baseband processing part is sent to a radio frequency (RF) emission link (only two radio frequency links are shown in the figure, and in actual application, one or more radio frequency links may be included), and the radio frequency emission link completes functions such as upsampling, emission forming filtering, clipping, and analog-to-digital conversion.

An analog signal processed by the radio frequency unit is sent to multiple power amplifiers, phase shifters, and antenna units, and is used to perform analog beamforming. The baseband processing part may implement sending of the signal with specific directionality by controlling a phase of a radio frequency phase shifter. The directionality is propagation directionality of electromagnetic wave energy, and a signal that is synthesized by multiple analog phase shifters and that is with the directionality is referred to as an analog beam. The radio frequency phase shifter is generally implemented by using a delay line or a PIN diode.

Phase adjustment takes a specific time, and therefore, when a communications protocol is designed, an impact of beam switching time needs to be considered. In this case, it is assumed that beams currently used by the wireless network device, for example, the base station, are respectively a beam 1 and a beam 6, and when analog beam switching is performed, the beam 1 may be switched to any one of beams 2 to 4, and the beam 6 may be switched to any one of a beam 5, a beam 7, or a beam 8. The baseband processing part is corresponding to a baseband processing module in FIG. 3a. The RF, the power amplifier, and the phase shifter may be disposed in the transmitter in FIG. 3a, and each RF link is corresponding to one group of beams.

In one embodiment, the system does not need to perform hardware switching in all symbols, and generally, there is one or more hardware switching locations in each subframe or each radio frame (an LTE system is used as an example, and one radio frame includes 10 subframes). In addition, cells of different base stations may be corresponding to different moments for hardware switching. For example, because different base stations may have different hardware parameters and configuration, the different base stations perform hardware switching at different moments. Different base stations may be configured with different quantities of antennas and have different coverage, and as a result, different base stations may have different quantities of beams, and have different amounts of switched hardware and different hardware switching locations. Therefore, each base station may independently configure a guard period for a data symbol that needs to be transmitted.

The embodiments of the present invention disclose a data symbol transmission method, a wireless network device, and a system, so as to improve resource utilization and increase a system capacity. The following separately provides detailed descriptions.

Figure 5:
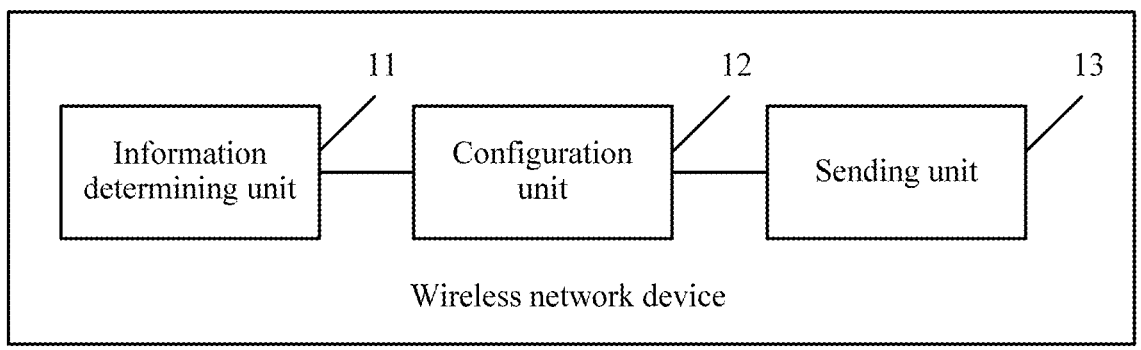
FIG. 5 is a schematic structural diagram of a wireless network device according to an embodiment of the present invention.

Referring to FIG. 5, FIG. 5 is a schematic structural diagram of a wireless network device according to an embodiment of the present invention. Specifically, as shown in FIG. 5, the wireless network device in this embodiment of the present invention may include an information determining unit 11, a configuration unit 12, and a sending unit 13.

The information determining unit 11 is configured to determine a location at which hardware switching needs to be performed in a current subframe and switching time of the hardware switching.

It should be noted that the wireless network device in this embodiment of the present invention is corresponding to the foregoing wireless network device. In this embodiment of the present invention, communication between a base station and user equipment is used as an example for description, that is, the wireless network device is the base station.

In a specific embodiment, the communication between the base station and the user equipment may be based on a subframe including multiple symbols. Before sending the subframe to the user equipment, the base station may detect, by using the information determining unit 11, whether hardware switching such as analog beam switching needs to be currently performed; and if hardware switching needs to be performed, the base station may further determine a hardware switching location in the subframe, and determine time required for the hardware switching, that is, the switching time, so as to select and configure the guard period for the data symbol based on the switching time.

The configuration unit 12 is configured to configure, according to the switching time, a first guard period for a first data symbol corresponding to the location, where a length of the first guard period is greater than or equal to that of the switching time.

Specifically, after the information determining unit 11 determines the hardware switching location in the current subframe and the switching time, the configuration unit 12 may configure, according to the switching time, the first guard period for the first data symbol corresponding to the location, for example, configure a guard period, that is, the first guard period, of a data symbol in the switching location as a guard period whose length is not less than that of the switching time.

Optionally, the first guard period may include a zero prefix (ZP) or a zero tail (ZT).

The configuration unit 12 is further configured to: use, as a second data symbol, a data symbol in the subframe other than the first data symbol, and configure a second guard period for the second data symbol.

At a location at which hardware switching is not performed, that is, for the data symbol in the subframe other than the first data symbol, the configuration unit 12 may further configure the second guard period for the second data symbol, for example, a cyclic prefix CP. A length of the second data symbol and a length of the second guard period may be separately pre-configured.

The sending unit 13 is configured to send the subframe to another wireless network device.

The communication between the base station and the user equipment is used as an example for description, that is, the another wireless network device is the user equipment.

Further, in this embodiment of the present invention, the sending unit 13 may be specifically configured to: send the first data symbol, the first guard period, the second data symbol, and the second guard period to the another wireless network device in a time-division multiplexing manner, where the first data symbol and the second data symbol include data that needs to be transmitted.

Optionally, in this embodiment of the present invention, the sending unit 13 is further configured to send a notification message to the another wireless network device, where the notification message is used to notify the another wireless network device of configuration information of the subframe, and the configuration information includes one or more of location information of the first data symbol, location information of the first guard period, or length information of the first guard period.

The notification message may be sent to the user equipment by the base station by using a broadcast channel or a control channel, so that the user equipment receives the notification message including the configuration information of the subframe and receives the subframe according to the configuration information. Specifically, the notification message is a message that can be received by all users in a cell of the base station, and includes, but is not limited to, a synchronization channel, a physical broadcast message, a system broadcast message indicated by a physical common control channel, and the like. Specifically, the sending unit 13 may send the notification message to the user equipment after the information determining unit 11 determines the hardware switching location in the current subframe and the switching time; or the sending unit 13 may send the notification message to the user equipment after the first guard period and the second guard period that are configured by the configuration unit 12 for the subframe are obtained, that is, after the configuration unit 12 completes configuring the guard periods for the subframe; or the sending unit 13 may send, after the information determining unit 11 determines the hardware switching location in the current subframe and the switching time and to the user equipment, a notification message including the location information of the first data symbol at which hardware switching needs to be performed, and send, to the user equipment, a notification message including information such as a location and the length of the first guard period after the configuration unit 12 completes configuring the guard periods for the subframe, and the like. This is not limited in this embodiment of the present invention.

Optionally, alternatively, the location information of the first data symbol, the location information of the first guard period, and the length information of the first guard period may be determined by the base station and the user equipment in advance. For example, the base station and the user equipment may determine the location information and the length information of the first data symbol and those of the first guard period according to a preset algorithm; or the location information and the length information may be pre-configured in the base station and the user equipment. Therefore, the base station configures and sends the guard period based on the location information and the length information, that is, configures a first guard period of a determined length for the first data symbol at a determined location, and configures the second guard period for a remaining symbol, that is, the second data symbol, of the subframe. The user equipment receives data based on the location information and the length information, that is, receives the first data symbol and the first guard period at the determined location, and receives the second data symbol and the second guard period at a remaining location of the subframe.

Specifically, the data symbol and the guard period corresponding to the data symbol may be collectively referred to as a symbol, that is, the first data symbol and the first guard period may be used as a first symbol, and the second data symbol and the second guard period may be used as a second symbol. Generally, the first symbol has a same length as the second symbol, and second data symbols in the subframe have a same length. When sending the subframe, for a first symbol configured with the ZP, the sending unit 13 first sends the ZP, that is, the first guard period, and then sends a data part, that is, the first data symbol; and for a first symbol configured with the ZT, the sending unit 13 first sends a data part, and then sends the ZT. When receiving the first symbol that includes the ZP, the user equipment performs frequency-domain equalization by using a ZP equalization method; or when receiving the second symbol that includes a CP, the user equipment performs frequency-domain equalization by using a CP equalization method, so as to improve system equalization performance. When performing frequency-domain equalization by using the CP equalization method, the user equipment may directly discard the CP, and process the data part only; or when performing frequency-domain equalization by using the ZP (or the ZT) equalization method, the user equipment cannot directly discard the ZP (or the ZT), and needs to superpose a part of the ZP (or the ZT) in a latter part of a symbol to a previous symbol, so as to form a cyclic symbol and change a linear convolution system to a cyclic convolution system, thereby implementing frequency-domain equalization. Details are not described herein.

It should be noted that, in some cases, symbols may have different lengths. Because the length of the subframe is configured as a fixed length, after completing configuring the first guard period and the second guard period, the configuration unit 12 may further detect whether a total length of the subframe (one subframe includes multiple symbols, and each symbol may be divided into a data symbol and a guard period) on which the guard period is configured reaches the fixed length. If the total length of the subframe does not reach the fixed length, a length of a guard period of a preset location, for example, a first symbol or a last symbol, in the subframe may be controlled to increase, so that the total length of the subframe reaches the fixed length. Similarly, if the total length of the subframe exceeds the fixed length, a length of a guard period at a preset location in the subframe may be controlled to be shortened, so that the total length of the subframe is shortened to the fixed length. For example, in the LTE, when a normal CP is configured, one timeslot (one subframe is divided into two timeslots) includes seven OFDM symbols, and a length of a guard period, for example, the CP, of a first symbol is configured as a length greater than those of guard periods of remaining six OFDM symbols, so as to ensure that a length of the timeslot is a fixed length of 0.5 ms.

Figure 6A:
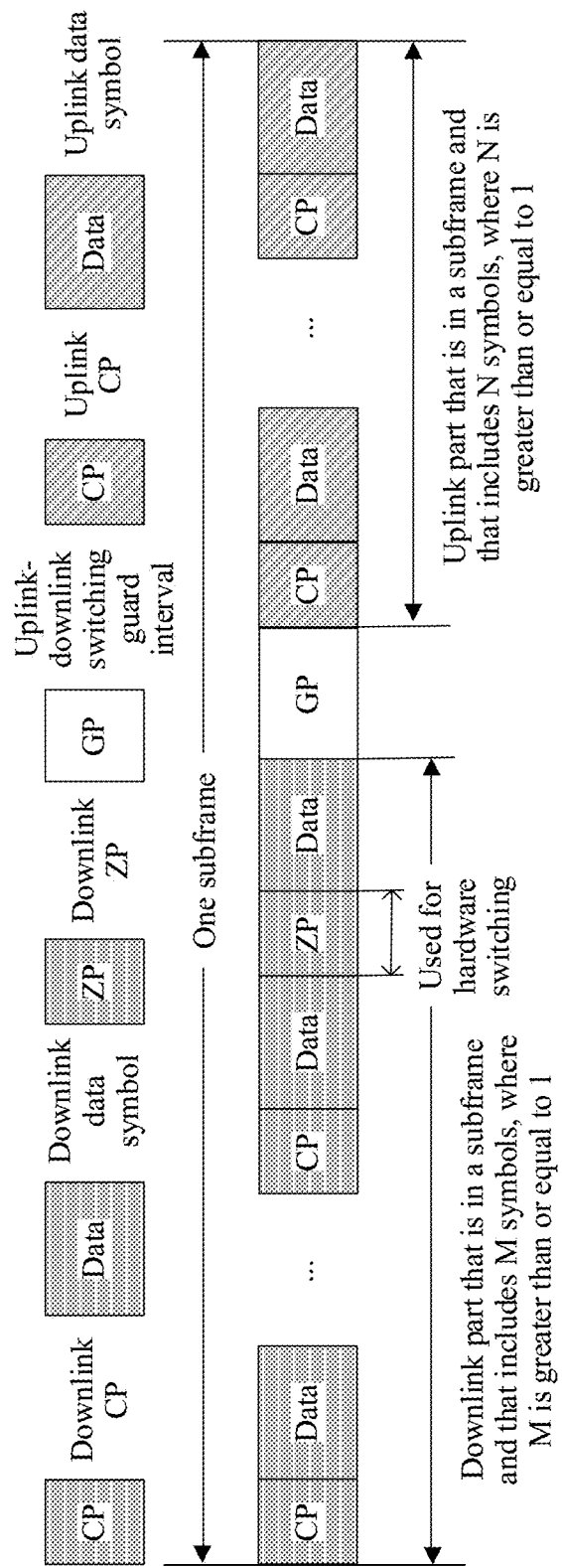
FIG. 6a is a structural diagram of a subframe according to an embodiment of the present invention.

For example, that the first guard period is the ZP and the second guard period is the CP is used as an example. Referring to FIG. 6a, FIG. 6a is a structural diagram of a subframe according to an embodiment of the present invention. As shown in FIG. 6a, the subframe may include an uplink part and a downlink part, and an uplink-downlink switching guard period (that is, the GP in the figure) is configured between the uplink part and the downlink part. The uplink part includes N symbols, and the downlink part includes M symbols. There may be a location at which hardware switching needs to be performed in the N symbols and/or the M symbols. For example, a ZP of the downlink part in the figure is the location at which hardware switching needs to be performed. N and M are greater than or equal to 1.

The figure shows a time division duplex (TDD) system, and a length of the uplink-downlink switching guard period is greater than a length of the symbol (for example, a length of a symbol n: a length of data plus a length of a CP). It should be understood that, in another optional embodiment, alternatively, the communications system may be a frequency division duplex (FDD) system. In addition, if the length of the uplink-downlink switching guard period is less than or equal to a sum of the length of the data and the length of the CP, processing may be performed still according to this embodiment.

Further, in this embodiment of the present invention, the wireless network device may further include (not shown in the figure):

a comparison unit 14, configured to compare the length of the first guard period with the length of the second guard period, where the length of the second guard period is pre-configured.

The configuration unit 12 is further configured to: when a comparison result of the comparison unit 14 is that the length of the first guard period is less than the length of the second guard period, configure the length of the first guard period to be the same as that of the second guard period.

In a specific embodiment, a guard period may be designed for the base station based on the hardware switching location and the switching time. Specifically, the comparison unit 14 may obtain the configured length of the first guard period at the hardware switching location, obtain the length of the second guard period at the location at which hardware switching is not performed, and compare the length of the first guard period with the length of the second guard period. When the length of the first guard period is less than the length of the second guard period, the configuration unit 12 may configure the length of the first guard period to be the same as that of the second guard period, for example, configure the length of the first guard period to be the same as that of the second guard period by adding zeros to the first guard period.

Alternatively, the configuration unit 12 may configure, for the first data symbol according to a difference between the length of the second guard period and that of the first guard period, the second guard period whose length is the same as the length difference, and guard periods configured for the first data symbol include the first guard period corresponding to the switching time and the second guard period whose length is the same as the length difference.

Figure 6B:
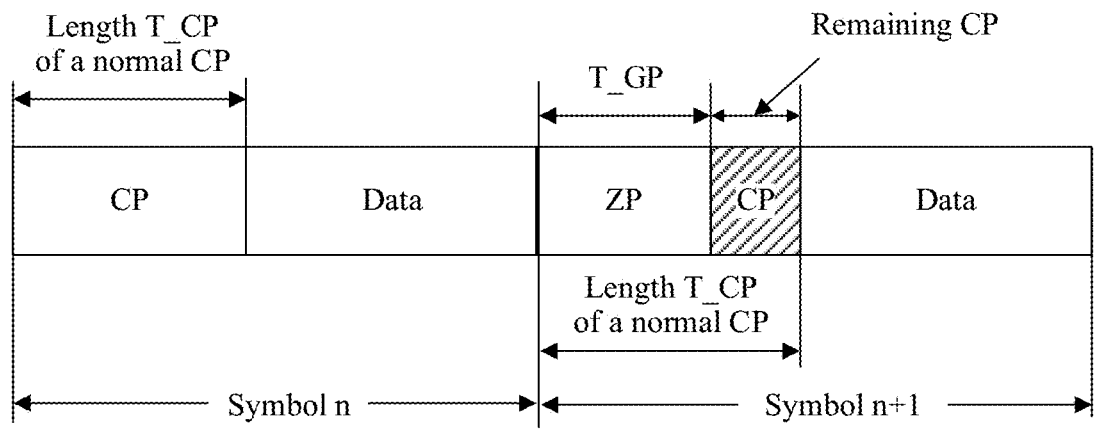
FIG. 6b is a diagram of a hardware switching scenario according to an embodiment of the present invention.

Specifically, further, referring to FIG. 6b, FIG. 6b is a diagram of a hardware switching scenario according to an embodiment of the present invention. With reference to FIG. 6a, that the first guard period is the ZP and the second guard period is the CP is used as an example. The ZP of the downlink part in FIG. 6a is the location at which hardware switching needs to be performed. It is assumed that hardware switching such as analog beam switching needs to be performed between a symbol n and a symbol n+1 in the subframe, the symbol n+1 is corresponding to the foregoing first symbol, and the symbol n is corresponding to the foregoing second symbol, and each symbol includes a data part (data symbol) and a guard period part.

In addition, it is assumed that a total length of the symbol n+1 is the same as that of the symbol n, and is denoted by T_symb. In addition, for ease of description, the length that is of the first guard period and that is equal to a length of the switching time of the hardware switching, that is, a length of the ZP, is denoted by T_GP, and a length of the second guard period, that is, a normal CP, configured for the second data symbol is denoted by T_CP (that is, a length of the CP that is of the symbol and that should be sent when hardware switching is not performed).

As shown in FIG. 6b, when the information determining unit 11 detects the location, for example, the symbol n+1, at which hardware switching needs to be performed and the comparison unit 14 detects that T_GP is less than or equal to T_CP, the configuration unit 12 may configure the normal CP at the symbol at which hardware switching is not performed, that is, the second symbol (including the symbol n). At the symbol at which hardware switching is performed, a front part of the CP is used for analog beam switching, and a remaining part of the CP is equivalent to the ZP configured with the length T_GP (T_CP−T_GP may be referred to as a remaining part of CP).

Optionally, alternatively, the configuration unit 12 may configure the length of the ZP as a length of the normal CP, for example, configure the length of the ZP to be the same as that of the normal CP by adding zeros to the ZP. That is, the sending unit 13 sends ZP-OFDM at a symbol at which analog beam switching is performed, for example, an orthogonal frequency division multiple access (OFDMA) symbol, and sends CP-OFDM at another symbol. When receiving the symbol that includes the normal CP, the user equipment performs frequency-domain equalization by using a CP method; or when receiving the symbol that includes a ZP, the user equipment performs frequency-domain equalization by using a ZP method, so as to improve system equalization performance.

Further, if T_GP is less than or equal to T_CP, the guard period configured for the first data symbol, that is, the guard period in the symbol n+1, includes the ZP (the first guard period) and the remaining part of CP, when receiving the symbol, the user equipment may directly remove the ZP and the CP, and directly perform frequency-domain equalization (that is, equivalently, the user equipment uses the ZP as the CP for processing); or the user equipment may estimate channel delay spread between the base station and the user equipment, and perform CP equalization or ZP equalization according to a relationship between the channel delay spread and the remaining part of CP. If a length of the channel delay spread is less than that of the remaining part of CP, CP equalization is performed; or if the length of the remaining part of CP is less than that of the channel delay spread, a difference obtained by subtracting the length of the remaining part of CP from the length of the channel delay spread is used as a "channel delay spread length" in the ZP system, and ZP equalization is performed.

Further, in this embodiment of the present invention, the comparison unit 14 is further configured to compare the length of the first guard period with a length of a second symbol, where the second symbol includes the second data symbol and the second guard period.

The wireless network device further includes:

a determining unit 15, configured to determine whether a system in which the subframe is located is a single-carrier system. For example, the determining unit 15 may perform the operation of determining when a comparison result of the comparison unit 14 is that the length of the first guard period is greater than the length of the second guard period and the length of the first guard period is less than the length of the second symbol, or perform the operation of determining at another moment. This is not limited herein.

The configuration unit 12 is further configured to: when the determining unit 15 determines that the system in which the subframe is located is a single-carrier system, and the comparison result of the comparison unit 14 is that the length of the first guard period is greater than the length of the second guard period and the length of the first guard period is less than the length of the second symbol, use a difference between the length of the second symbol and the length of the first guard period as a length of data that is in the first data symbol and that needs to be transmitted.

Figure 6C:
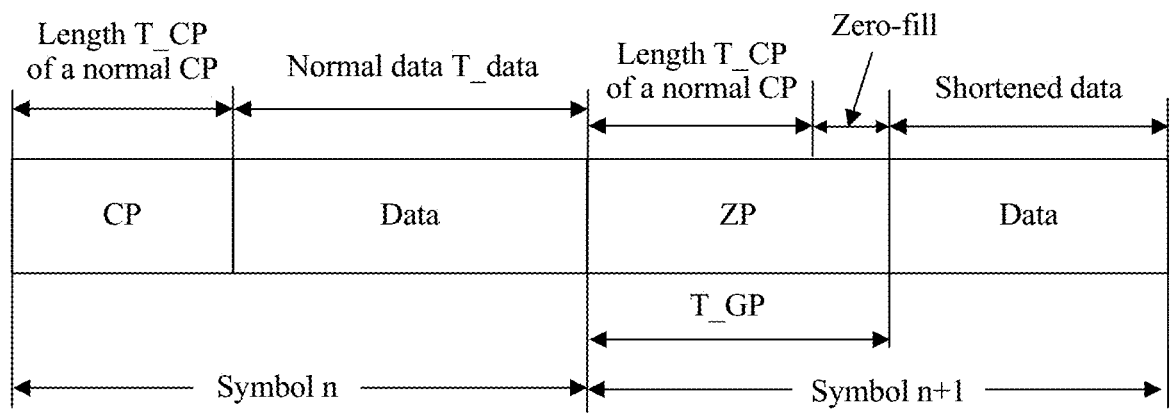
FIG. 6c is a diagram of another hardware switching scenario according to an embodiment of the present invention.

Specifically, when the comparison unit 14 detects that T_CP<T_GP<T_symb, the determining unit 15 may further determine whether the current communications system is a single-carrier system or a multi-carrier system. As shown in FIG. 6c, if the current communications system is a single-carrier system, the configuration unit 12 may configure the normal CP at the symbol, that is, the symbol n, at which beam switching is not performed; add zeros to T_GP or perform other processing (to ensure that the user equipment cannot receive T_GP information, or to ensure that the user equipment does not receive T_GP information because the user equipment considers that the T_GP information is invalid, where the user equipment needs to learn the length of the first guard period) at the symbol, that is, the symbol n+1, at which beam switching is performed; and use, as a length of the first data symbol, a difference between the length of the first guard period, that is, T_GP, and a sum (a length of the symbol n), that is, T_symb, of the length of the second data symbol and the length of the second guard period. In addition, the whole first data symbol may be used to transmit data, and a length of valid data sent by the sending unit 13 is shortened. When receiving the symbol that includes the normal CP, the user equipment performs frequency-domain equalization by using the CP method; or when receiving the symbol that includes the ZP, the user equipment performs frequency-domain equalization by using the ZP method, so as to improve the system equalization performance.

Further, in this embodiment of the present invention, the wireless network device may further include (not shown in the figure):

a mapping unit 16, configured to: when the determining unit 15 determines that the system in which the subframe is located is not a single-carrier system, the length of the first guard period is greater than the length of the second guard period, and the length of the first guard period is less than the length of the second symbol, calculate a difference between the length of the first guard period and the length of the second guard period, determine, according to the difference and the length of the second data symbol, a quantity of subcarriers required for spacing, and perform frequency-domain distributed resource mapping according to the quantity of subcarriers, so that the user equipment demodulates the first data symbol.

The configuration unit 12 is further configured to: use, as a length of the first data symbol, a difference between the length of the second symbol and the length of the first guard period, and use a target length in the first data symbol as a length of the data that needs to be transmitted, where the target length is a quotient obtained by dividing the length of the second data symbol by a sum of one and the quantity of subcarriers.

When the system in which the subframe is located is not a single-carrier system, it may be determined that the subframe is located in a multi-carrier system. The multi-carrier system includes, but is not limited to, the OFDM system, a pre-coded OFDM system (discrete fourier transform-spread OFDM, "DFT-s-OFDM" for short), and the like. Distributed resource mapping is mapping performed on data of a subcarrier at intervals of subcarriers for spacing (that is, the foregoing quantity of subcarriers), and zeros are added to or no data is sent on the subcarriers for spacing, that is, the subcarrier corresponding to the quantity of subcarriers.

For example, a specific manner in which the mapping unit 16 determines, according to the difference and the length of the second data symbol, the quantity of subcarriers required for spacing is as follows: The mapping unit 16 compares a quotient obtained by dividing the difference by the length of the second data symbol with (k−1)/k and k/(k+1); and if the quotient is less than or equal to (k−1)/k, the mapping unit 16 determines that the quantity of subcarriers required for spacing is k−1; or if the quotient is greater than (k−1)/k and less than k/(k+1), the mapping unit 16 determines that the quantity of subcarriers required for spacing is k. K is an integer greater than or equal to 2.

Figure 6D:
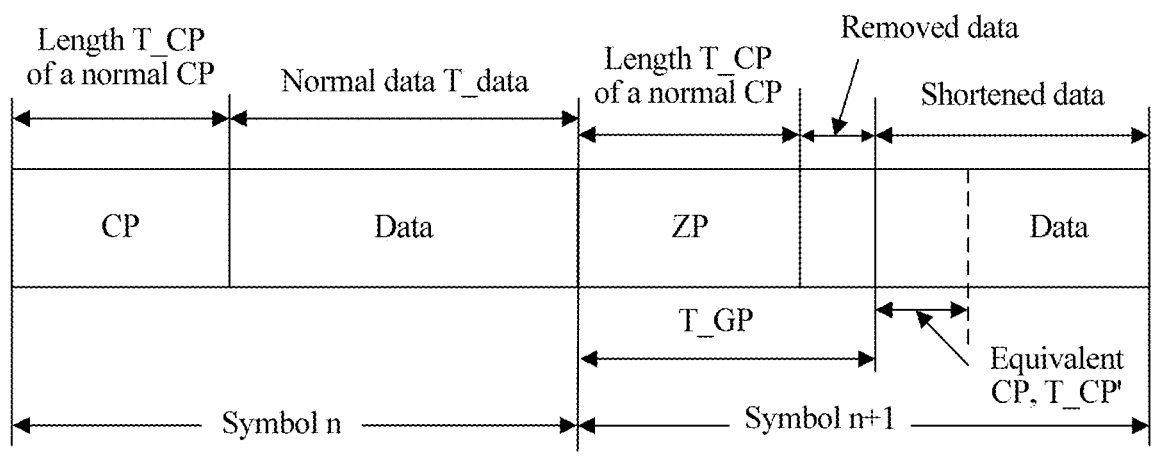
FIG. 6d is a diagram of a still another hardware switching scenario according to an embodiment of the present invention.

Further, when the comparison unit 14 detects that T_CP<T_GP<T_symb, and the determining unit 15 determines that the current communications system is a multi-carrier system rather than a single-carrier system, as shown in FIG. 6d, the configuration unit 12 may configure the normal CP at the symbol n at which beam switching is not performed, and at the symbol n+1 at which beam switching is performed, the mapping unit 16 determines, according to a normal length T_data of data and the difference between the length of the first guard period and the length of the second guard period, that is, (T_GP−T_CP), the quantity of subcarriers required for spacing to perform distributed resource mapping, which is equivalent to sending valid information repeatedly in a time domain.

The configuration unit 12 configures the normal CP at the symbol n, and adds zeros to T_GP or performs other processing (to ensure that the user equipment cannot receive T_GP information, or to ensure that the user equipment does not receive T_GP information because the user equipment considers that the T_GP information is invalid, where the user equipment needs to learn the length of the first guard period) at the symbol n+1, so as to ensure that the user equipment successfully demodulates the symbol n+1. A length of valid data sent by the sending unit 13 is shortened (the length of the valid data is the target length, that is, a quotient obtained by dividing T_data by the sum of one and the quantity of subcarriers required for spacing).

Figure 6E:
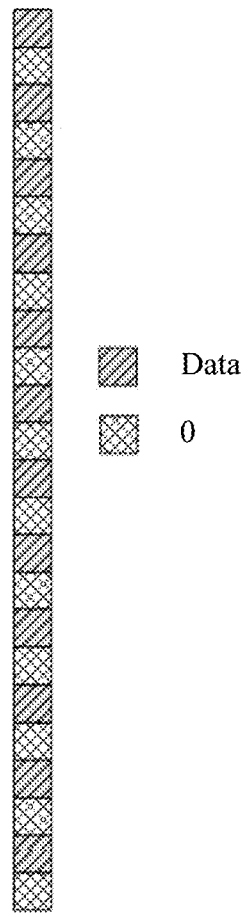
FIG. 6e is a schematic diagram of frequency-domain distributed mapping according to an embodiment of the present invention.

Further, referring to FIG. 6e, FIG. 6e is a schematic diagram of frequency-domain distributed mapping according to an embodiment of the present invention. When it is assumed that (T_GP−T_CP)<T_data/2, that is, the quotient (T_GP−T_CP)/T_data obtained by dividing the difference between the length of the first guard period and the length of the second guard period by the length of the second data symbol is less than ½, that is, K=2, the mapping unit 16 may determine that the quantity of subcarriers required for spacing is 1, and may control performing of ½ length mapping, that is, performing frequency-domain mapping at intervals of one subcarrier, and adding zeros to a remaining subcarrier.

Valid data sent by the sending unit 13 at the symbol n+1 is (T_data−T_CP′−(T_GP−T_CP)), that is, T_data/2, and T_CP′=T_data/2−(T_GP−T_CP). When receiving the subframe, the user equipment may perform demodulation by using data in a remaining part, that is, T_CP′, as an equivalent CP in a data part of the symbol n+1. For example, the user equipment may directly remove the ZP and the CP, and directly perform frequency-domain equalization; or may estimate channel delay spread between the base station and the user equipment, and perform CP equalization or ZP equalization. Details are not described herein. Valid data received by the user equipment is a (T_data−T_CP′−(T_GP−T_CP)) part, that is, T_data/2.

It should be understood that, in an actual application scenario, other distributed mapping may be selected according to required analog beam switching time. For example, when T_data*¾>(T_GP−T_CP)>2*T_data/3, the mapping unit 16 may perform frequency-domain resource mapping at intervals of three subcarriers, and valid data sent by the sending unit 13 at the symbol n+1 is T_data/4.

Figure 7A:
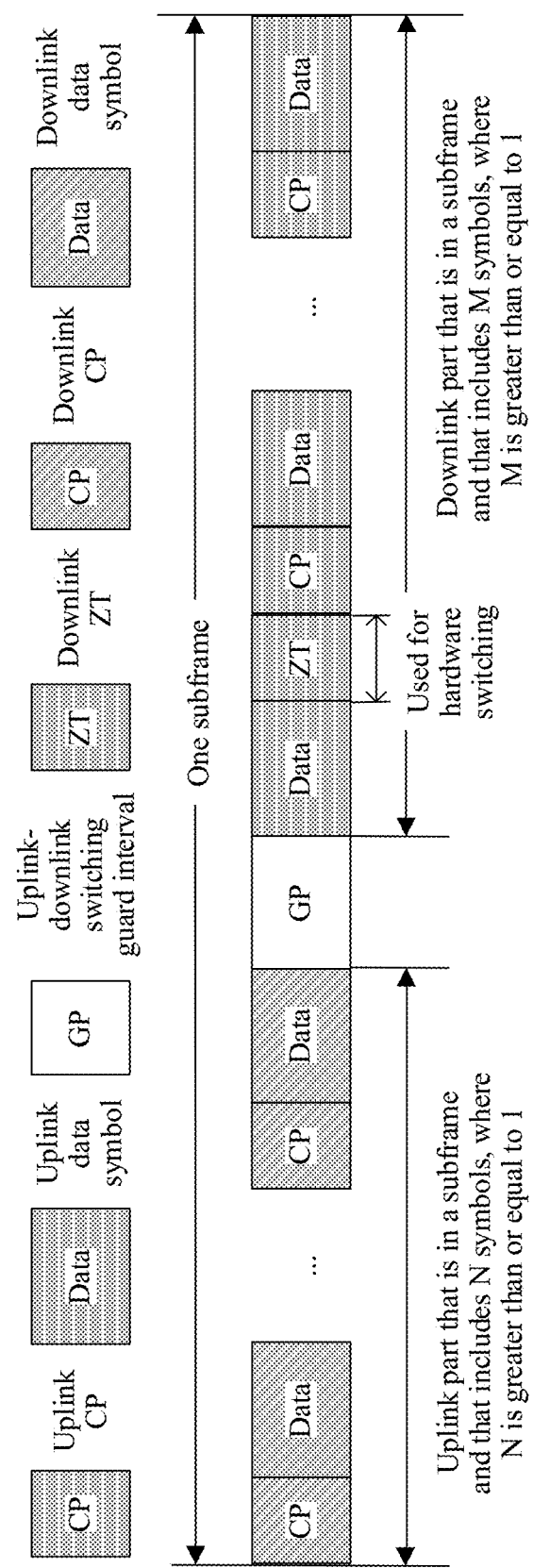
FIG. 7a is a structural diagram of another subframe according to an embodiment of the present invention.

For another example, that the first guard period is the ZT and the second guard period is the CP is used as an example. Referring to FIG. 7a, FIG. 7a is a structural diagram of another subframe according to an embodiment of the present invention. As shown in FIG. 7a, the subframe may include an uplink part and a downlink part, and an uplink-downlink switching guard period (that is, the GP in the figure) is configured between the uplink part and the downlink part. The uplink part includes N symbols, and the downlink part includes M symbols. There may be a location at which hardware switching needs to be performed in the N symbols and/or the M symbols.

For example, a ZT of the downlink part in the figure is the location at which hardware switching needs to be performed. N and M are greater than or equal to 1. Similarly, it is assumed that hardware switching such as analog beam switching needs to be performed between the symbol n and the symbol n+1 in the subframe (n is a natural number), the symbol n is corresponding to the foregoing first symbol, the symbol n+1 is corresponding to the foregoing second symbol, and each symbol includes a data part (data symbol) and a guard period part.

Figure 7B:
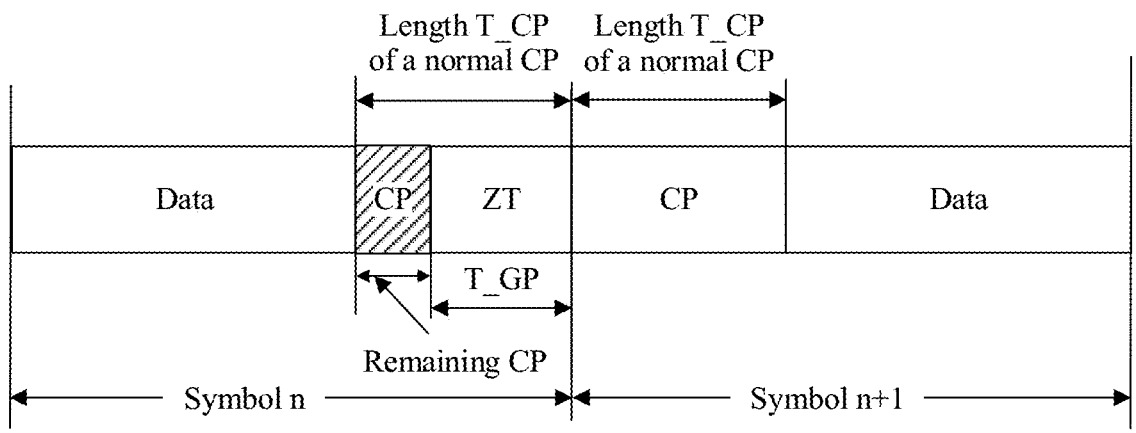
FIG. 7b is a diagram of yet another hardware switching scenario according to an embodiment of the present invention.

In addition, it is assumed that each symbol has a same total length that is denoted by T_symb. Further, the length that is of the first guard period and that is equal to a length of the switching time of the hardware switching, that is, a length of the ZT, is denoted by T_GP, and a length of the second guard period, that is, a normal CP, configured for the second data symbol is denoted by T_CP. As shown in FIG. 7b, when the information determining unit 11 detects the location, for example, the symbol n, at which hardware switching needs to be performed, and the comparison unit 14 detects that T_GP is less than or equal to T_CP, the configuration unit 12 may configure the normal CP at the symbol at which beam switching is not performed, that is, the second symbol (including the symbol n+1); and at the symbol n at which beam switching is performed, a front part of the CP is used for analog beam switching, and a remaining part of the CP is equivalent to the ZT configured with the length T_GP, or the configuration unit 12 may further configure the length of the ZT as T_CP. Details are not described herein. When receiving the symbol that includes the ZT, the user equipment performs frequency-domain equalization by using a ZT method; or when receiving the symbol that includes the normal CP, the user equipment performs frequency-domain equalization by using the CP method, so as to improve system equalization performance.

Figure 7C:
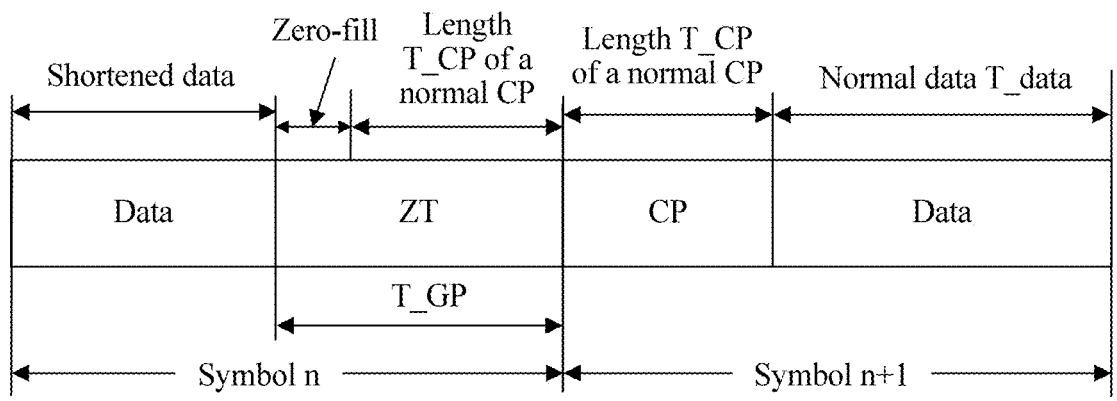
FIG. 7c is a diagram of a further hardware switching scenario according to an embodiment of the present invention.

Further, when the comparison unit 14 detects that T_CP<T_GP<T_symb, the determining unit 15 may further determine whether the current communications system is a single-carrier system or a multi-carrier system. As shown in FIG. 7c, if the current communications system is a single-carrier system, the configuration unit 12 may configure the normal CP at the symbol, that is, the symbol n+1, at which beam switching is not performed; add zeros to T_GP at the symbol, that is, the symbol n, at which beam switching is performed; and use (T_symb−T_GP) as the length of the first data symbol. In addition, (T_symb−T_GP) may be used to transmit data, and a length of valid data sent by the sending unit 13 is shortened. When receiving the symbol including the normal CP, the user equipment performs frequency-domain equalization by using the CP method; or when receiving the symbol that includes the ZT, the user equipment performs frequency-domain equalization by using the ZP method, so as to improve the system equalization performance.

Figure 7D:
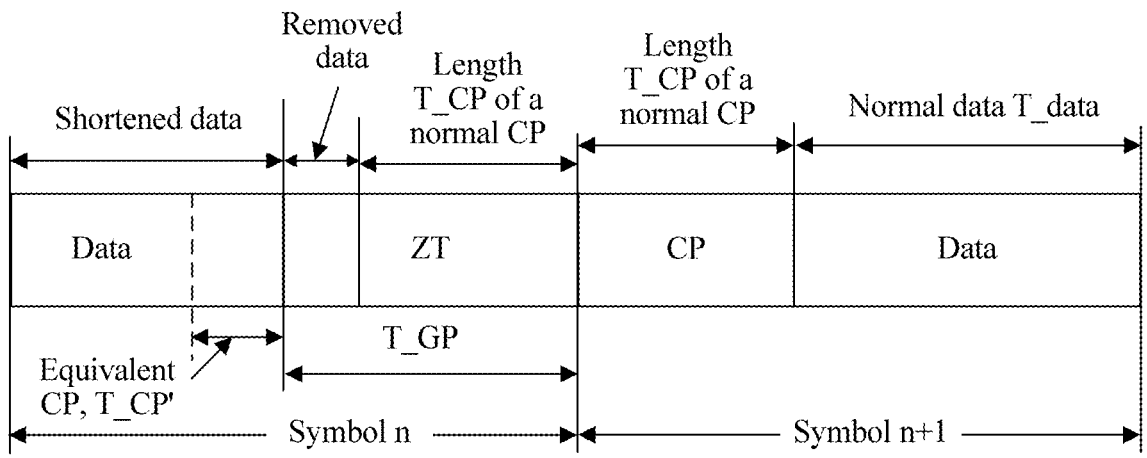
FIG. 7d is a diagram of a still further hardware switching scenario according to an embodiment of the present invention.

When the comparison unit 14 detects that T_CP<T_GP<T_symb and the determining unit 15 determines that the current communications system is a multi-carrier system, as shown in FIG. 7d, the configuration unit 12 may configure the normal CP at the symbol n+1 at which beam switching is not performed, and at the symbol n at which beam switching is performed, the mapping unit 16 determines, according to a normal length T_data of data and the difference between the length of the first guard period and the length of the second guard period, that is, (T_GP−T_CP), the quantity of subcarriers required for spacing, so as to perform distributed resource mapping. For example, when (T_GP−T_CP)<T_data/2, the mapping unit 16 may control performing of frequency-domain resource mapping at intervals of one subcarrier, which is equivalent to sending valid information repeatedly in the time domain. Valid data sent by the sending unit 13 is a (T_data−T_CP'−(T_GP−T_CP)) part, that is, T_data/2. In an actual application scenario, alternatively, the base station may select other distributed mapping according to required analog beam switching time. Details are not described herein.

In this embodiment of the present invention, the base station can dynamically configure the guard period for the symbol in the cell according to the hardware switching location and required switching time, and perform special processing on a sent symbol at the hardware switching location, without a need to reserve an extra GP, thereby reducing required air interface reservation overheads at the hardware switching location, effectively improving air interface resource utilization, increasing available air interface resources, and improving a system capacity. In addition, cells of different base stations may be enabled to implement adaptive configuration of the guard period, thereby reducing complexity of uniformly designing a frame structure.

Figure 8:
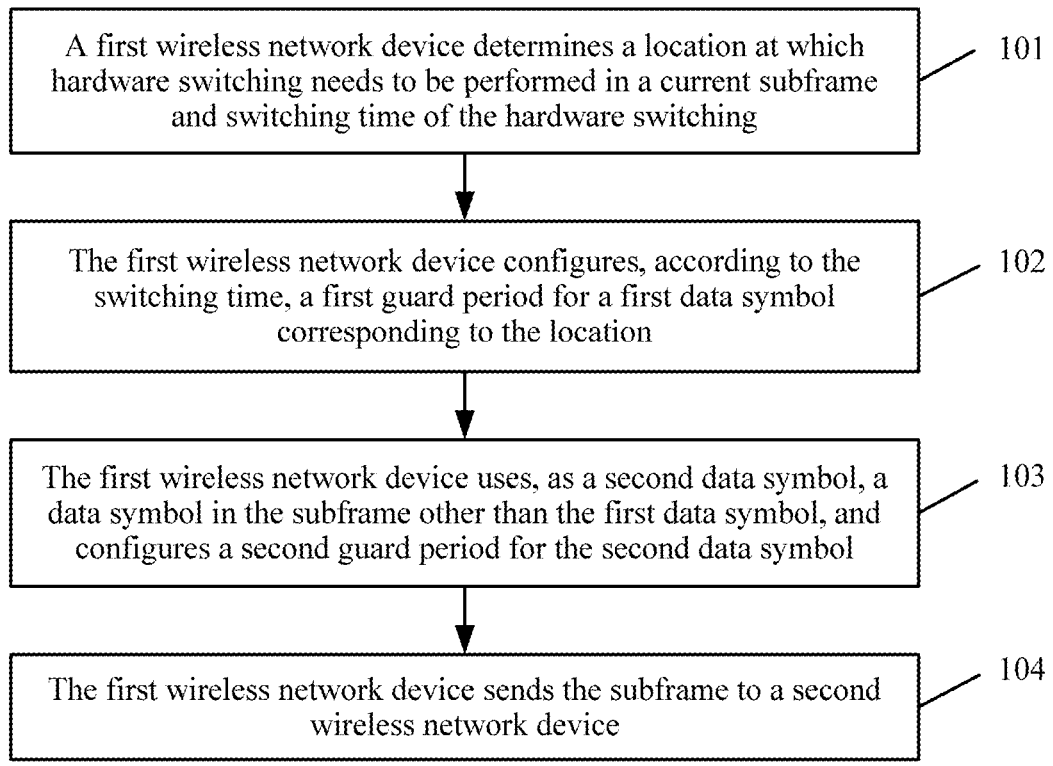
FIG. 8 is a schematic flowchart of a data symbol transmission method according to an embodiment of the present invention.

Referring to FIG. 8, FIG. 8 is a schematic flowchart of a data symbol transmission method according to an embodiment of the present invention. Specifically, as shown in FIG. 8, the method includes the following operations.

Operation 101. A first wireless network device determines a location at which hardware switching needs to be performed in a current subframe and switching time of the hardware switching.

Operation 102. The first wireless network device configures, according to the switching time, a first guard period for a first data symbol corresponding to the location, where a length of the first guard period is greater than or equal to that of the switching time.

Operation 103. The first wireless network device uses, as a second data symbol, a data symbol in the subframe other than the first data symbol, and configures a second guard period for the second data symbol.

Optionally, the first guard period may include a zero prefix ZP, and the second guard period is a cyclic prefix CP. Alternatively, the first guard period may include a zero tail ZT, and the second guard period is a cyclic prefix CP.

Optionally, the first wireless network device may compare the length of the first guard period with a length of the second guard period; and if the length of the first guard period is less than the length of the second guard period, the first wireless network device configures the length of the first guard period to be the same as that of the second guard period. The length of the second guard period may be pre-configured.

Optionally, the first wireless network device may further separately compare the length of the first guard period with the length of the second guard period and a length of a second symbol, where the second symbol includes the second data symbol and the second guard period. The first wireless network device determines whether a system in which the subframe is located is a single-carrier system. If the system in which the subframe is located is a single-carrier system, the length of the first guard period is greater than the length of the second guard period, and the length of the first guard period is less than the length of the second symbol, the first wireless network device uses a difference between the length of the second symbol and the length of the first guard period as a length of data that is in the first data symbol and that needs to be transmitted.

Further, optionally, when the system in which the subframe is located is not a single-carrier system, the length of the first guard period is greater than the length of the second guard period, and the length of the first guard period is less than the length of the second symbol, the first wireless network device may further calculate a difference between the length of the first guard period and the length of the second guard period, determine, according to the difference and a length of the second data symbol, a quantity of subcarriers required for spacing, and perform frequency-domain distributed resource mapping according to the quantity of subcarriers, so that a second wireless network device demodulates the first data symbol. The first wireless network device uses, as a length of the first data symbol, a difference between the length of the second symbol and the length of the first guard period, and uses a target length in the first data symbol as a length of the data that needs to be transmitted, where the target length is a quotient obtained by dividing the length of the second data symbol by a sum of one and the quantity of subcarriers.

Optionally, after completing configuring the guard period for the current subframe, the first wireless network device may further send a notification message to the second wireless network device, where the notification message is used to notify the second wireless network device of configuration information of the subframe, and the configuration information includes one or more of location information of the first data symbol, location information of the first guard period, or length information of the first guard period, so that user equipment can receive data based on the configuration information of the subframe.

The notification message may be sent to the second wireless network device, for example, the user equipment, by the first wireless network device, for example, the base station, by using a broadcast channel or a control channel. Specifically, the notification message is a message that can be received by all users in a cell of the base station, and includes, but is not limited to, a synchronization channel, a physical broadcast message, a system broadcast message indicated by a physical common control channel, and the like.

Optionally, alternatively, the location information of the first data symbol, the location information of the first guard period, and the length information of the first guard period may be determined with the user equipment in advance.

Operation 104. The first wireless network device sends the subframe to the second wireless network device.

Specifically, that the subframe is sent to the second wireless network device may be specifically sending the first data symbol, the first guard period, the second data symbol, and the second guard period to the user equipment in a time-division multiplexing manner, where the first data symbol and the second data symbol include the data that needs to be transmitted.

This embodiment of the present invention and the device embodiment in FIG. 5 are based on a same conception, the first wireless network device is corresponding to the wireless network device in the embodiment corresponding to FIG. 5, the second wireless network device is corresponding to the another wireless network device in the embodiment corresponding to FIG. 5, and technical effects brought by this embodiment of the present invention and the device embodiment are also the same. For a specific implementation, refer to descriptions in the embodiment in FIG. 5. Details are not described herein again.

Figure 9:
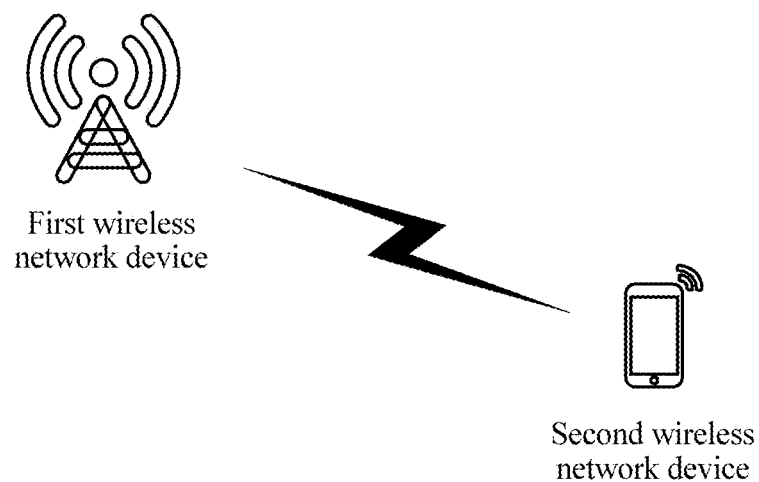
FIG. 9 is a schematic structural diagram of a data symbol transmission system according to an embodiment of the present invention.

Referring to FIG. 9, FIG. 9 is a schematic structural diagram of a data symbol transmission system according to an embodiment of the present invention. Specifically, as shown in FIG. 9, the data symbol transmission system in this embodiment of the present invention includes: a first wireless network device 1 and a second wireless network device 2.

The first wireless network device 1 is configured to: determine a location at which hardware switching needs to be performed in a current subframe and switching time of the hardware switching; configure, according to the switching time, a first guard period for a first data symbol corresponding to the location, where a length of the first guard period is greater than or equal to that of the switching time; use, as a second data symbol, a data symbol in the subframe other than the first data symbol, and configure a second guard period for the second data symbol; and send the subframe to the second wireless network device 2.

The second wireless network device 2 is configured to: receive the subframe sent by the first wireless network device 1, where the subframe includes a first symbol configured with the first guard period and a second symbol configured with the second guard period; and perform frequency-domain equalization on the first symbol by using a frequency-domain equalization technology corresponding to the first guard period, and perform frequency-domain equalization on the second symbol by using a frequency-domain equalization technology corresponding to the second guard period.

The first wireless network device may be a base station or user equipment; and the second wireless network device may be user equipment or a base station. For example, communication related to this embodiment of the present invention may be between the base station and the user equipment or between base stations, for example, between a macro base station and a micro base station; or may be between different user equipments, for example, communication in a D2D network.

The first symbol includes the first guard period and the first data symbol, the second symbol further includes the second guard period and the second data symbol, and the first data symbol and the second data symbol include the data that needs to be transmitted. Optionally, the first guard period may be a zero prefix ZP or a zero tail ZT, and the second guard period may be a cyclic prefix CP.

Optionally, that the second wireless network device performs frequency-domain equalization on the first symbol by using a frequency-domain equalization technology corresponding to the first guard period may be specifically: determining, by the second wireless network device, whether a carrier system in which the subframe is located is a single-carrier system; and if the carrier system in which the subframe is located is a single-carrier system, performing, by the second wireless network device, frequency-domain equalization on the first symbol by using the frequency-domain equalization technology corresponding to the first guard period; or if the carrier system in which the subframe is located is not a single-carrier system, performing, by the second wireless network device, frequency-domain equalization on the first symbol by using the frequency-domain equalization technology corresponding to the second guard period.

Optionally, the system further has the following functions:

sending, by the first wireless network device 1 to the second wireless network device 2, a notification message that includes configuration information of the subframe, where the configuration information includes one or more of location information of the first data symbol, location information of the first guard period, or length information of the first guard period; and receiving, by the second wireless network device 2, the notification message that is sent by the first wireless network device 1 and that includes the configuration information of the subframe, and receiving the subframe according to the configuration information.

Optionally, alternatively, the location information of the first data symbol, the location information of the first guard period, and the length information of the first guard period may be determined by the first wireless network device and the second wireless network device in advance.

Specifically, when sending the subframe, for a first symbol (including the ZP and a data part) configured with the ZP, the first wireless network device, for example, the base station, first sends the ZP, that is, the first guard period, and then sends the data part, that is, the first data symbol; and for a first symbol (including the ZT and a data part) on which the ZT is configured, the first wireless network device, for example, the base station, first sends the data part, and then sends the ZT. When receiving the first symbol that includes the ZP, the second wireless network device, for example, the user equipment, performs frequency-domain equalization by using a ZP equalization method; or when receiving the second symbol that includes a CP, the second wireless network device, for example, the user equipment, performs frequency-domain equalization by using a CP equalization method, so as to improve system equalization performance. When performing frequency-domain equalization by using the CP equalization method, the user equipment may directly discard the CP, and process the data part only; or when performing frequency-domain equalization by using the ZP (or the ZT) equalization method, the user equipment does not superpose a part of the ZP (or the ZT) in a latter part of a symbol to a previous symbol, so as to form a cyclic symbol and change a linear convolution system to a cyclic convolution system, thereby implementing frequency-domain equalization. Details are not described herein.

The first wireless network device 1 may be configured to execute the data symbol transmission method shown in FIG. 8, and is corresponding to the wireless network device in the embodiment in FIG. 5. For meanings of terms and examples used in this embodiment, refer to the embodiments corresponding to FIG. 5 and FIG. 8. Details are not described herein again.

In this embodiment of the present invention, the wireless network device, for example, the base station, can dynamically configure the guard period for the symbol in the cell according to the hardware switching location and required switching time, and perform special processing on a sent symbol at the hardware switching location, without a need to reserve an extra GP, thereby reducing required air interface reservation overheads at the hardware switching location, effectively improving air interface resource utilization, increasing available air interface resources, and improving a system capacity. In addition, cells of different base stations may be enabled to implement adaptive configuration of the guard period, thereby reducing complexity of uniformly designing a frame structure.

Figure 10:
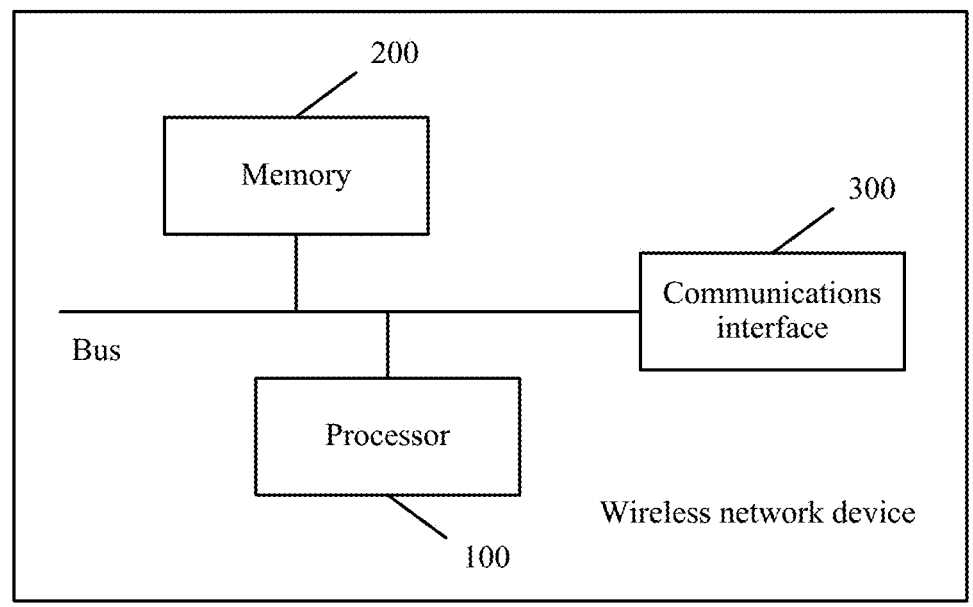
FIG. 10 is a schematic structural diagram of another wireless network device according to an embodiment of the present invention.

Referring to FIG. 10, FIG. 10 is a schematic structural diagram of another wireless network device according to an embodiment of the present invention. Specifically, as shown in FIG. 10, the wireless network device according to this embodiment of the present invention includes a communications interface 300, a memory 200, and a processor 100, and the processor 100 is separately connected to the communications interface 300 and the memory 200. The memory 200 may be a high-speed RAM memory, or may be a nonvolatile memory (non-volatile memory), such as at least one magnetic disk memory. A data connection between the communications interface 300, the memory 200, and the processor 100 may be implemented by using a bus, or may be implemented in another manner. A connection implemented by using the bus is described in this embodiment. Specifically, the wireless network device in this embodiment of the present invention may be corresponding to the wireless network device corresponding to FIG. 5, may be corresponding to the first wireless network device in the embodiment corresponding to FIG. 9, and may be specifically a base station or user equipment in a communications network. For details, refer to related descriptions in the embodiments corresponding to FIG. 5 to FIG. 10.

The memory 200 is configured to store driver software.

The processor 100 reads the driver software from the memory, and performs, when driven by the driver software, the following operations:

determining a location at which hardware switching needs to be performed in a current subframe and switching time of the hardware switching;

configuring, according to the switching time, a first guard period for a first data symbol corresponding to the location, where a length of the first guard period is greater than or equal to that of the switching time;

using, as a second data symbol, a data symbol in the subframe other than the first data symbol, and configuring a second guard period for the second data symbol; and sending the subframe to another wireless network device by using the communications interface 300.

Optionally, when sending the subframe to the another wireless network device, the processor 100 specifically performs the following operations:

sending the first data symbol, the first guard period, the second data symbol, and the second guard period to the another wireless network device in a time-division multiplexing manner by using the communications interface 300, where the first data symbol and the second data symbol include data that needs to be transmitted.

Optionally, the processor 100 is further configured to: read the driver software from the memory; and perform, when driven by the driver software, the following operations:

comparing the length of the first guard period with a length of the second guard period, where the length of the second guard period is pre-configured; and if the length of the first guard period is less than the length of the second guard period, configuring the length of the first guard period to be the same as that of the second guard period.

Optionally, the processor 100 is further configured to: read the driver software from the memory; and perform, when driven by the driver software, the following operations:

separately comparing the length of the first guard period with the length of the second guard period and a length of a second symbol, where the second symbol includes the second data symbol and the second guard period;

determining whether a system in which the subframe is located is a single-carrier system; and if the system in which the subframe is located is a single-carrier system, the length of the first guard period is greater than the length of the second guard period, and the length of the first guard period is less than the length of the second symbol, using a difference between the length of the second symbol and the length of the first guard period as a length of data that is in the first data symbol and that needs to be transmitted.

Optionally, the processor 100 is further configured to: read the driver software from the memory; and perform, when driven by the driver software, the following operations:

separately comparing the length of the first guard period with the length of the second guard period and the length of the second symbol, where the second symbol includes the second data symbol and the second guard period;

determining whether a system in which the subframe is located is a single-carrier system;

if the system in which the subframe is located is not a single-carrier system, the length of the first guard period is greater than the length of the second guard period, and the length of the first guard period is less than the length of the second symbol, calculating a difference between the length of the first guard period and the length of the second guard period, determining, according to the difference and a length of the second data symbol, a quantity of subcarriers required for spacing, and performing frequency-domain distributed resource mapping according to the quantity of subcarriers, so that the another wireless network device demodulates the first data symbol; and using, as a length of the first data symbol, a difference between the length of the second symbol and the length of the first guard period, and using a target length in the first data symbol as a length of the data that needs to be transmitted, where the target length is a quotient obtained by dividing the length of the second data symbol by a sum of one and the quantity of subcarriers.

Optionally, the processor 100 is further configured to: read the driver software from the memory; and perform, when driven by the driver software, the following operations:

sending a notification message to the another wireless network device by using the communications interface 300, where the notification message is used to notify the another wireless network device of configuration information of the subframe, and the configuration information includes one or more of location information of the first data symbol, location information of the first guard period, or length information of the first guard period.

Optionally, the location information of the first data symbol, the location information of the first guard period, and the length information of the first guard period are determined with the another wireless network device in advance.

Optionally, the first guard period includes a zero prefix ZP, and the second guard period includes a cyclic prefix CP.

Optionally, the first guard period includes a zero tail ZT, and the second guard period includes a cyclic prefix CP.

Figure 11:
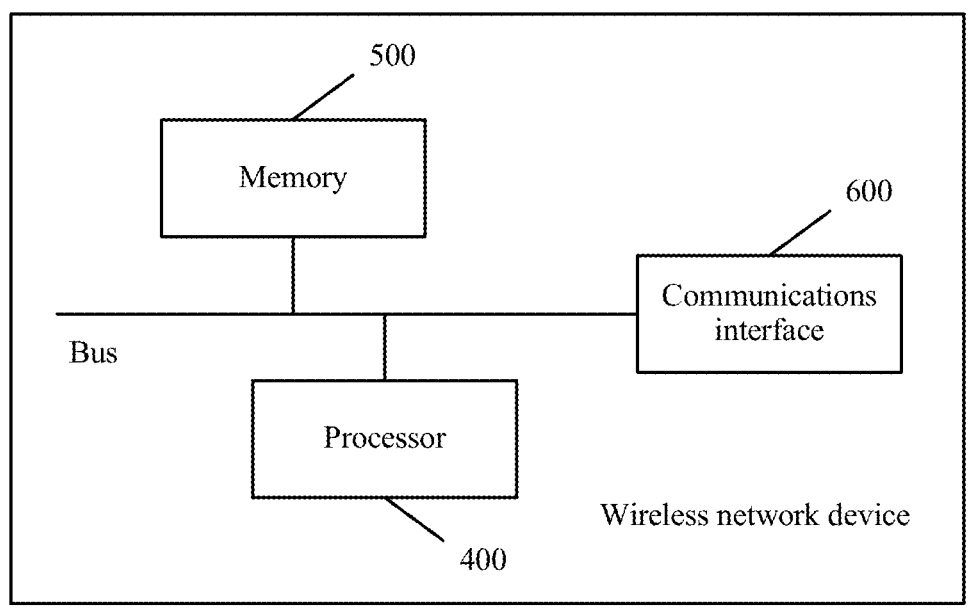
FIG. 11 is a schematic structural diagram of still another wireless network device according to an embodiment of the present invention.

Further, referring to FIG. 11, FIG. 11 is a schematic structural diagram of still another wireless network device according to an embodiment of the present invention. Specifically, as shown in FIG. 11, the wireless network device according to this embodiment of the present invention includes a communications interface 600, a memory 500, and a processor 400, and the processor 400 is separately connected to the communications interface 600 and the memory 500. The memory 500 may be a high-speed RAM memory, or may be a nonvolatile memory (non-volatile memory), such as at least one magnetic disk memory. A data connection between the communications interface 600, the memory 500, and the processor 400 may be implemented by using a bus, or may be implemented in another manner. A connection implemented by using the bus is described in this embodiment. Specifically, for details about the wireless network device in this embodiment of the present invention, refer to related descriptions of the another wireless network device in the embodiment in FIG. 5 and the second wireless network device in the embodiment corresponding to FIG. 9. The wireless network device may be specifically user equipment or a base station in a communications network.

The memory 500 is configured to store driver software.

The processor 400 reads the driver software from the memory, and performs, when driven by the driver software, the following operations:

receiving a subframe sent by another wireless network device by using the communications interface 600, where the subframe includes a first symbol configured with a first guard period and a second symbol configured with a second guard period; and performing frequency-domain equalization on the first symbol by using a frequency-domain equalization technology corresponding to the first guard period, and performing frequency-domain equalization on the second symbol by using a frequency-domain equalization technology corresponding to the second guard period.

Optionally, when performing frequency-domain equalization on the first symbol by using a frequency-domain equalization technology corresponding to the first guard period, the processor 400 specifically performs the following steps:

determining whether a carrier system in which the subframe is located is a single-carrier system; and if the carrier system in which the subframe is located is a single-carrier system, performing frequency-domain equalization on the first symbol by using the frequency-domain equalization technology corresponding to the first guard period; or if the carrier system in which the subframe is located is not a single-carrier system, performing frequency-domain equalization on the first symbol by using the frequency-domain equalization technology corresponding to the second guard period; where the first symbol further includes a first data symbol, the second symbol further includes a second data symbol, and the first data symbol and the second data symbol include the data that needs to be transmitted.

Optionally, the first guard period includes a zero prefix ZP, and the second guard period includes a cyclic prefix CP.

Optionally, the first guard period includes a zero tail ZT, and the second guard period includes a cyclic prefix CP.

Optionally, the processor 400 is further configured to perform the following step:

receiving, by using the communications interface 600, a notification message that is sent by the another wireless network device and that includes configuration information of the subframe, and receiving the subframe according to the configuration information, where the configuration information includes one or more of location information of the first data symbol, location information of the first guard period, or length information of the first guard period.

Optionally, the location information of the first data symbol, the location information of the first guard period, and the length information of the first guard period are determined with the another wireless network device in advance.

In the foregoing embodiments, the description of each embodiment has respective focuses. For a part that is not described in detail in an embodiment, reference may be made to related descriptions in other embodiments.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A wireless device operating as a first wireless device, comprising:
   a processor configured to:
      determine a location at which hardware switching needs to be performed in a current subframe and switching time of the hardware switching,
      configure, according to the switching time, a first guard period for a first data symbol corresponding to the location, wherein a length of the first guard period is greater than or equal to that of the switching time, and
      use, as a second data symbol, a data symbol in the subframe other than the first data symbol, and configure a second guard period for the second data symbol, and in response to determining that the length of the first guard period is shorter than a length of a second guard period, configure the length of the first guard period to be identical to the second guard period, and
   a transmitter configured to send the subframe to a second wireless device;
   wherein the first wireless device is a base station, and the second wireless device is a terminal; or, the first wireless device is a terminal, and the second wireless device is a base station.

2. The wireless device according to claim 1, wherein the transmitter is configured to:
   send the first data symbol, the first guard period, the second data symbol, and the second guard period to the second wireless device in a time-division multiplexing manner, wherein the first data symbol and the second data symbol comprise data that needs to be transmitted.

3. The wireless device according to claim 1, wherein the length of the second guard period is pre-configured.

4. The wireless device according to claim 1, further comprising a comparison unit configured to:
   separately compare the length of the first guard period with the length of the second guard period and a length of a second symbol, wherein the second symbol comprises the second data symbol and the second guard period;
   determine whether a system in which the subframe is located is a single-carrier system; and
   in response to determining that the system in which the subframe is located is a single-carrier system, and the length of the first guard period is greater than the length of the second guard period and the length of the first guard period is shorter than the length of the second symbol, use a difference between the length of the second symbol and the length of the first guard period as a length of data that is in the first data symbol and that needs to be transmitted.

5. The wireless device according to claim 1, further comprising a comparison unit configured to:
   separately compare the length of the first guard period with the length of the second guard period and a length of a second symbol, wherein the second symbol comprises the second data symbol and the second guard period;
   determine whether a system in which the subframe is located is a single-carrier system;
   in response to determining that the system in which the subframe is located is not a single-carrier system, and the length of the first guard period is greater than the length of the second guard period and the length of the first guard period is shorter than the length of the second symbol,
      calculate a difference between the length of the first guard period and the length of the second guard period,
      determine, according to the difference and a length of the second data symbol, a quantity of subcarriers required for spacing, and
      perform frequency-domain distributed resource mapping according to the quantity of subcarriers; and
   use, as a length of the first data symbol, a difference between the length of the second symbol and the length of the first guard period, and use a target length in the first data symbol as a length of the data that needs to be transmitted, wherein the target length is a quotient obtained by dividing the length of the second data symbol by a sum of one and the quantity of subcarriers.

6. The wireless device according to claim 1, wherein:
   the transmitter is further configured to send a notification message to the second wireless device, wherein the notification message is used to notify the second wireless device of configuration information of the subframe, and the configuration information comprises one or more of location information of the first data symbol, location information of the first guard period, or length information of the first guard period.

7. The wireless device work according to claim 6, wherein the location information of the first data symbol, the location information of the first guard period, and the length information of the first guard period are determined with the second wireless device in advance.

8. The wireless device according to claim 1, wherein the first guard period comprises a zero prefix (ZP), and the second guard period comprises a cyclic prefix (CP).

9. The wireless device according to claim 1, wherein the first guard period comprises a zero tail (ZT), and the second guard period comprises a cyclic prefix (CP).

10. A data symbol transmission method, comprising:
   determining, by a first wireless device, a location at which hardware switching needs to be performed in a current subframe and switching time of the hardware switching;
   configuring, by the first wireless device according to the switching time, a first guard period for a first data symbol corresponding to the location, wherein a length of the first guard period is greater than or equal to that of the switching time;
   using, by the first wireless device as a second data symbol, a data symbol in the subframe other than the first data symbol, and configuring a second guard period for the second data symbol, and in response to determining that the length of the first guard period is shorter than a length of a second guard period, configure the length of the first guard period to be identical to the second guard period; and
   sending, by the first wireless device, the subframe to a second wireless device;
   wherein the first wireless device is a base station, and the second wireless device is a terminal; or, the first wireless device is a terminal, and the second wireless device is a base station.

11. The method according to claim 10, wherein the sending, by the first wireless device, the subframe to a second wireless device comprises:
   sending, by the first wireless device, the first data symbol, the first guard period, the second data symbol, and the second guard period to the second wireless device in a time-division multiplexing manner, wherein the first data symbol and the second data symbol comprise data that needs to be transmitted.

12. The method according to claim 10, wherein the length of the second guard period is pre-configured.

13. The method according to claim 10, wherein before the sending, by the first wireless device, the subframe to a second wireless device, the method further comprises:
   separately comparing, by the first wireless device, the length of the first guard period with the length of the second guard period and a length of a second symbol, wherein the second symbol comprises the second data symbol and the second guard period;
   determining, by the first wireless device, whether a system in which the subframe is located is a single-carrier system; and
   if the system in which the subframe is located is a single-carrier system, the length of the first guard period is greater than the length of the second guard period, and the length of the first guard period is less than the length of the second symbol, using, by the first wireless device, a difference between the length of the second symbol and the length of the first guard period as a length of data that is in the first data symbol and that needs to be transmitted.

14. The method according to claim 10, wherein before the sending, by the first wireless device, the subframe to a second wireless device, the method further comprises:
   comparing, by the first wireless device, the length of the first guard period with the length of the second guard period and a length of a second symbol, wherein the second symbol comprises the second data symbol and the second guard period;
   determining, by the first wireless device, whether a system in which the subframe is located is a single-carrier system;
   if the system in which the subframe is located is not a single-carrier system, the length of the first guard period is greater than the length of the second guard period, and the length of the first guard period is shorter than the length of the second symbol,
   calculating, by the first wireless device, a difference between the length of the first guard period and the length of the second guard period,
   determining, according to the difference and a length of the second data symbol, a quantity of subcarriers required for spacing, and
   performing frequency-domain distributed resource mapping according to the quantity of subcarriers; and
   using, by the first wireless device as a length of the first data symbol, a difference between the length of the second symbol and the length of the first guard period, and using a target length in the first data symbol as a length of the data that needs to be transmitted, wherein the target length is a quotient obtained by dividing the length of the second data symbol by a sum of one and the quantity of subcarriers.

15. The method according to claim 10, further comprising:
   sending, by the first wireless device, a notification message to the second wireless device, wherein the notification message is used to notify the second wireless device of configuration information of the subframe, and the configuration information comprises one or more of location information of the first data symbol, location information of the first guard period, or length information of the first guard period.

16. The method according to claim 15, wherein the location information of the first data symbol, the location information of the first guard period, and the length information of the first guard period are determined by the first wireless device and the second wireless device in advance.

17. The method according to claim 10, wherein the first guard period comprises a zero prefix (ZP), and the second guard period comprises a cyclic prefix (CP).

18. The method according to claim 10, wherein the first guard period comprises a zero tail (ZT), and the second guard period comprises a cyclic prefix (CP).

19. A non-transitory computer storage medium, comprising instructions, which, when executed by a computer, cause the computer to perform operations, the operations comprising:
   determining, a location at which hardware switching needs to be performed in a current subframe and switching time of the hardware switching;
   configuring, according to the switching time, a first guard period for a first data symbol corresponding to the location, wherein a length of the first guard period is greater than or equal to that of the switching time;
   using, as a second data symbol, a data symbol in the subframe other than the first data symbol, and configuring a second guard period for the second data symbol, and in response to determining that the length of the first guard period is shorter than a length of a second guard period, configure the length of the first guard period to be identical to the second guard period; and
   sending the subframe to a second wireless device.

20. The computer storage medium according to claim 19, wherein sending the subframe to a second wireless device comprises:
sending the first data symbol, the first guard period, the second data symbol, and the second guard period to the second wireless device in a time-division multiplexing manner, wherein the first data symbol and the second data symbol comprise data that needs to be transmitted.

* * * * *